US012697258B2

(12) United States Patent
Trimble et al.

(10) Patent No.: US 12,697,258 B2
(45) Date of Patent: Aug. 4, 2026

(54) PATIENT TRANSPORT APPARATUS WITH BASE STABILIZERS FOR LOADING AND UNLOADING REMOVABLE LITTERS

(71) Applicant: Stryker Corporation, Kalamazoo, MI (US)

(72) Inventors: Shawn Trimble, Portage, MI (US); Christopher Gentile, Sturgis, MI (US)

(73) Assignee: Stryker Corporation, Portage, MI (US)

( * ) Notice: Subject to any disclaimer, the term of this patent is extended or adjusted under 35 U.S.C. 154(b) by 420 days.

(21) Appl. No.: 18/569,252

(22) PCT Filed: Mar. 30, 2022

(86) PCT No.: PCT/US2022/022455
§ 371 (c)(1),
(2) Date: Dec. 12, 2023

(87) PCT Pub. No.: WO2023/027769
PCT Pub. Date: Mar. 2, 2023

(65) Prior Publication Data

US 2024/0277537 A1 Aug. 22, 2024

Related U.S. Application Data

(60) Provisional application No. 63/237,301, filed on Aug. 26, 2021.

(51) Int. Cl.
*A61G 3/02* (2006.01)
*A61G 1/06* (2006.01)
*A61G 7/16* (2006.01)

(52) U.S. Cl.
CPC ............ *A61G 3/0218* (2013.01); *A61G 1/06* (2013.01); *A61G 7/165* (2016.11)

(58) Field of Classification Search
CPC .............................. A61G 3/0218; B62B 3/022
See application file for complete search history.

(56) References Cited

U.S. PATENT DOCUMENTS 6,125,485 A * 10/2000 Way ..................... A61G 7/0524 5/625
7,086,103 B2 * 8/2006 Barthelt ............... A61G 7/0528 5/81.1 R (Continued)

FOREIGN PATENT DOCUMENTS

CN 103156743 A * 6/2013 ............... A61G 7/16
EP 1738732 B1 5/2008

(Continued)

OTHER PUBLICATIONS

International Search Report for Application No. PCT/US2022/022455 dated Jul. 18, 2022, 2 pages.

*Primary Examiner* — Steve Clemmons
(74) *Attorney, Agent, or Firm* — Howard & Howard Attorneys PLLC

(57) ABSTRACT

A patient transport apparatus for patients. The patient transport apparatus comprises a base having a base frame and an intermediate frame. The patient support further comprises a litter configured to be docked to and undocked from a trolley that is configured to slidably translate along the intermediate frame between a plurality of positions including a trolley forward position and a trolley docking position. The litter is configured to be supported by the base in a cantilevered position when the trolley is in the trolley docking position. The base includes a stabilizer that is configured for movement between a retracted configuration and a deployed configuration. In the deployed configuration the stabilizer engages a floor surface to brace the base at an additional (Continued)

point of contact with the floor surface to stabilize the base when the litter is in the cantilevered position.

17 Claims, 28 Drawing Sheets

(56) References Cited

U.S. PATENT DOCUMENTS

| | | | | |
|---|---|---|---|---|
| 7,140,055 | B2 * | 11/2006 | Bishop | A61G 1/0218 296/20 |
| 7,398,571 | B2 | 7/2008 | Souke et al. | |
| 7,461,857 | B2 * | 12/2008 | Darling, III | A61G 1/0293 280/640 |
| 7,478,855 | B2 * | 1/2009 | Lambarth | A61G 3/0254 296/19 |
| 8,439,416 | B2 | 5/2013 | Lambarth et al. | |
| 9,486,373 | B2 | 11/2016 | Lambarth et al. | |
| 9,510,981 | B2 | 12/2016 | Lambarth et al. | |
| 10,028,868 | B2 * | 7/2018 | Naber | A61G 3/0272 |
| 10,307,314 | B2 * | 6/2019 | Griffith | A61G 5/128 |
| 10,744,049 | B2 | 8/2020 | Naber et al. | |
| 10,758,437 | B2 | 9/2020 | Lucas et al. | |
| 10,857,047 | B2 * | 12/2020 | Furman | A61G 5/066 |
| 11,298,279 | B2 | 4/2022 | Trimble et al. | |
| 11,304,865 | B2 * | 4/2022 | Furman | A61G 7/08 |
| 2018/0028383 | A1 | 2/2018 | Stryker et al. | |
| 2018/0369036 | A1 | 12/2018 | Furman et al. | |
| 2020/0179191 | A1 | 6/2020 | Trimble et al. | |
| 2020/0179199 | A1 | 6/2020 | Feliksa | |
| 2021/0030606 | A1 | 2/2021 | Xu et al. | |

FOREIGN PATENT DOCUMENTS

| | | | | | |
|---|---|---|---|---|---|
| GB | 2286769 | A | * | 8/1995 | A61G 1/06 |
| WO | WO-2005105012 | A1 | * | 11/2005 | A61G 1/0225 |

* cited by examiner

PATIENT TRANSPORT APPARATUS WITH BASE STABILIZERS FOR LOADING AND UNLOADING REMOVABLE LITTERS

CROSS-REFERENCE TO RELATED APPLICATIONS

The subject patent application claims priority to and all the benefits of U.S. Provisional Patent Application No. 63/237,301, filed on Aug. 26, 2021, the disclosure of which is hereby incorporated by reference in its entirety.

BACKGROUND

Patient support systems facilitate care of patients in a health care setting. Patient support systems comprise patient transport apparatuses such as, for example, hospital beds, stretchers, cots, tables, wheelchairs, chairs, stair chairs, and the like. Many conventional patient transport apparatuses, such as for example cots, generally include a base arranged for movement about floor surfaces, and a litter upon which a patient can be positioned or otherwise supported. Here, one or types of lift mechanisms may be employed to facilitate adjusting a vertical position of the litter relative to the base to, among other things, promote patient care, load the patient transport apparatus into an ambulance, and the like.

Conventional stair chairs (or "evacuation chairs") are configured to facilitate transporting a seated patient up or down a flight of stairs, such as by employing tracks that allow for controlled descent down a staircase. Those having ordinary skill in the art will appreciate that, when used in connection with certain emergency medical services, stair chairs are typically realized as separate patient transport apparatuses from cots. Further, many conventional ambulances are configured to facilitate loading, securing, and transporting cots, but typically only employ storage space for stair chairs. Thus, in scenarios where a patient being transported via an ambulance on a cot must be transported up or down stairs using a stair chair, the patient sometimes has to be transferred between different patient transport apparatuses, such as from a stair chair to a cot which may subsequently be loaded into an ambulance.

A patient support system designed to overcome one or more of the aforementioned challenges is desired.

SUMMARY

The present disclosure is directed towards a patient transport apparatus for supporting a patient. The patient transport apparatus includes a base having a head end and a foot end. The base has a base frame supporting a plurality of wheels arranged for movement about a floor surface at respective contact points, and an intermediate frame having a trolley configured to translate between a plurality of trolley positions including a trolley forward position where the trolley is arranged at the head end of the base and a trolley docking position where the at trolley is arranged at the foot end of the base. The base also includes a base lift device to move the intermediate frame relative to the base frame between a plurality of vertical configurations including a maximum raised configuration and a maximum lowered configuration. The patient support apparatus also includes a litter configured to be docked to and undocked from the trolley of the intermediate frame such that, when docked to the trolley, the litter is configured to slidably translate relative to the intermediate frame between a plurality of litter positions including a litter forward position where the trolley is in the trolley forward position and a cantilevered position where the trolley is in the trolley docking position such that the litter is cantilevered off the foot end of the base to facilitate docking and undocking the litter from the trolley. A stabilizer is operatively attached to the foot end of the intermediate frame and configured for movement between a retracted configuration where the stabilizer is spaced from the floor surface, and a deployed configuration where the stabilizer engages the floor surface to brace the base at an additional point of contact with the floor surface to stabilize the base in the cantilevered position.

DETAILED DESCRIPTION

Figure 1A:
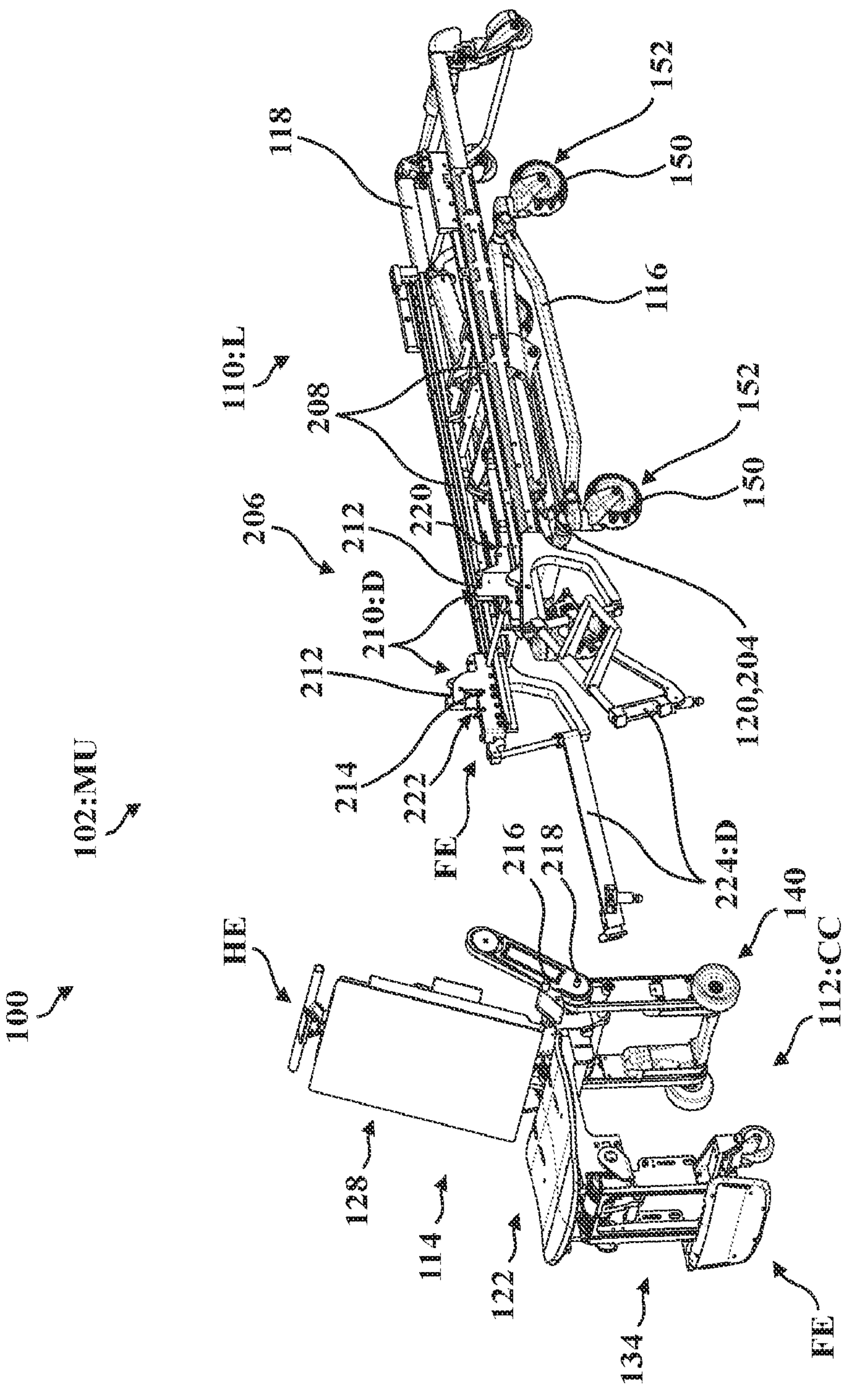
FIG. 1A is a perspective view of a patient transport apparatus of a patient support system of the present disclosure, shown with the patient transport apparatus operating in an undocked mode with a base having stabilizers arranged in a deployed configuration to brace the base against floor surfaces for loading a litter, the litter shown positioned adjacent to the base and arranged in a chair configuration.
Figure 1B:
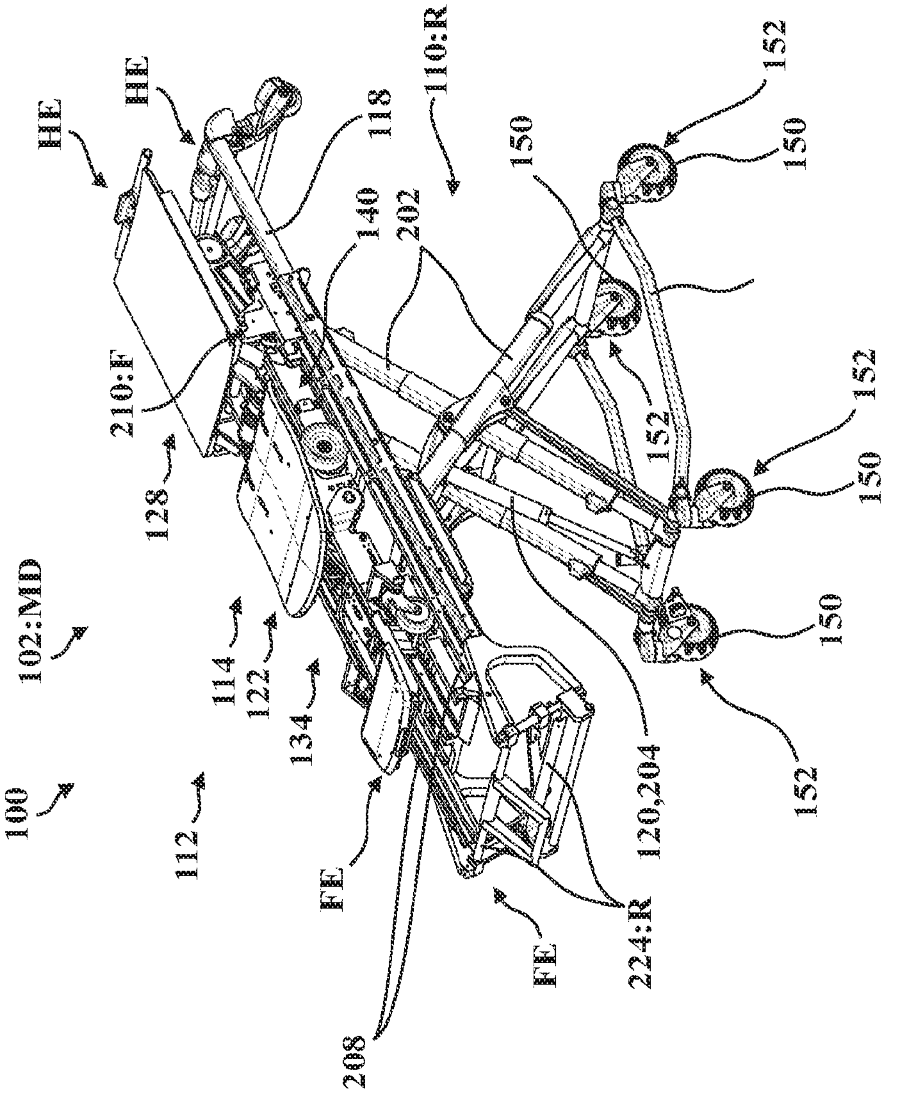
FIG. 1B is another perspective view of the patient transport apparatus of FIG. 1A, shown with the patient transport apparatus operating in a docked mode with the litter secured to the base and with the stabilizers arranged in a retracted configuration.
Figure 4A:
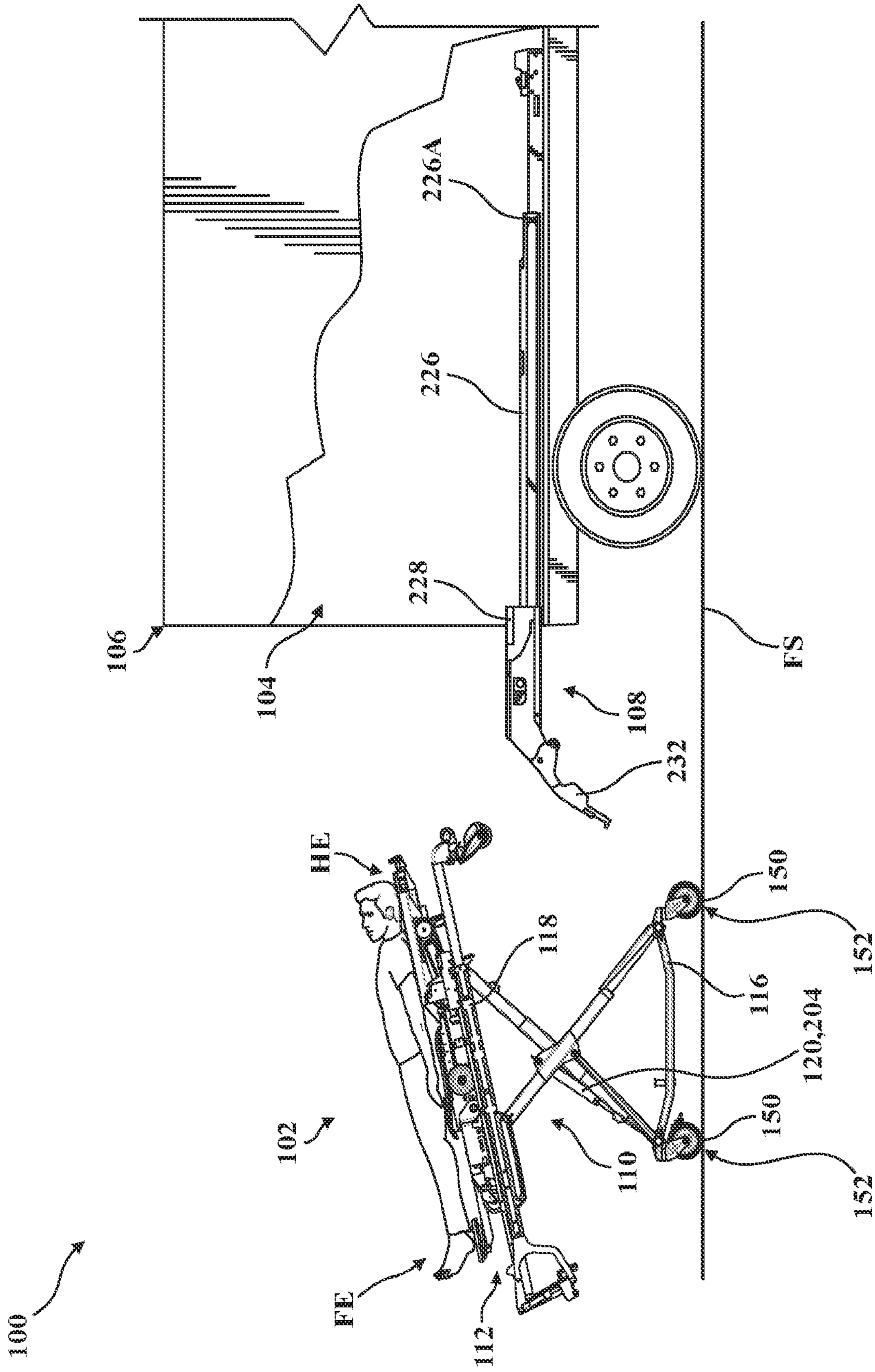
FIG. 4A is another side view of the patient transport apparatus of FIGS. 1A-3G, shown positioned adjacent to a cargo area of an ambulance to which a power load device is secured, with the base of the patient transport apparatus shown arranged in a raised configuration.

Referring to FIGS. 1A-1B and 4A, portions of a patient support system 100 are shown including a patient transport apparatus 102 for supporting a patient in a health care setting according to aspects of the present disclosure. In some versions, the patient transport apparatus 102 is configured to be loaded into a cargo area 104 of an ambulance 106, such as via a power load device 108 (see FIGS. 4A-4C). As will be appreciated from the subsequent description below, while the illustrated versions of the patient transport apparatus 102 described herein are configured as cots for transporting patients, the patient transport apparatus 102 may comprise a hospital bed, a stretcher, a table, a wheelchair, a chair, or a similar apparatus utilized in the care of a patient. The version of the patient transport apparatus 102 shown in FIGS. 1A-1B generally comprises a base 110 and a litter 112. The litter 112 defines or otherwise comprises a patient support surface 114 to support a patient.

In some versions, the patient transport apparatus 102 may comprise a reconfigurable patient support as described in U.S. Pat. No. 9,486,373, which is hereby incorporated by reference in its entirety. In some versions, the patient transport apparatus 102 may comprise a reconfigurable transport apparatus as described in U.S. Pat. No. 9,510,981, which is hereby incorporated by reference in its entirety. In some versions, the patient transport apparatus 102 may comprise a person support apparatus system as described in U.S. Patent Application Publication No. 2018/0028383, which is hereby incorporated by reference in its entirety. In some versions, the patient transport apparatus 102 may comprise a patient transfer apparatus with integrated tracks as described in U.S. patent application Ser. No. 15/854,943, which is hereby incorporated by reference in its entirety. In some versions, the patient transport apparatus 102 may comprise a variable speed patient transfer apparatus as described in U.S. patent application Ser. No. 15/854,199, which is hereby incorporated by reference in its entirety. In some versions, the patient transport apparatus 102 may comprise a patient transfer apparatus as described in U.S. patent application Ser. No. 15/855,161, which is hereby incorporated by reference in its entirety. In some versions, the patient transport apparatus 102 may comprise an ambulance cot as described in U.S. Pat. No. 7,398,571, which is hereby incorporated by reference in its entirety.

With continued reference to FIGS. 1A-1B, the base 110 and litter 112 each have a head end HE and a foot end FE corresponding to designated placement of the patient's head and feet on the patient transport apparatus 102. In FIG. 1A, the litter 112 is shown separated from the base 110; as is described in greater detail below, the base 110 is configured to removably receive and support the litter 112 in certain situations. Put differently, in the illustrated version, the litter 112 is configured for releasable attachment to the base 110. The base 110 generally includes a base frame 116, an intermediate frame 118, and a base lift device 120. The intermediate frame 118 is spaced above the base frame 116 and is moved relative to the base frame 116 via the base lift device 120 as described in greater detail below. Although not illustrated in detail in the drawings, a mattress (or sections thereof) may be disposed on or integral with the litter 112. In such circumstances, the mattress comprises or otherwise defines a secondary patient support surface 114 upon which the patient is supported.

As will be described in greater detail below in connection with FIGS. 3A-8, in the illustrated versions, the litter 112 employs a plurality of assemblies, some of which are capable of being articulated relative to others in various ways and under certain operating conditions to adjust the patient support surface 114 and to facilitate docking to and undocking from the base 110. In the illustrated version, the litter 112 generally includes a seat assembly 122 with a seat frame 124 and a seat section 126, a fowler assembly 128 with a fowler frame 130 and a fowler section 132, a front assembly 134 with a front frame 136 and a front section 138, a rear assembly 140 with a rear frame 142, and a ski assembly 144. Each of the assemblies 122, 128, 134, 140, 144 introduced above will be described in greater detail below.

In the illustrated versions, the fowler assembly 128 pivots relative to the seat assembly 122 about a fowler axis XW, the front assembly 134 pivots relative to the seat assembly 122 about a front axis XF, and the rear assembly 140 pivots relative to the seat assembly 122 about a rear axis XR. In addition, the ski assembly 144 pivots about the rear axis XR as described in greater detail below, but could pivot about other axes in some configurations. In the illustrated version, the seat section 126, the fowler section 132, and the front section 138 each provide support to the patient and, thus, generally cooperate to define the patient support surface 114. In the illustrated version, the front section 138 is also configured to translate along the front frame 136, such as is described in U.S. patent application Ser. No. 16/705,878, the disclosure of which is hereby incorporated by reference in its entirety. It will be appreciated that the fowler section 132 and the front section 138 may pivot relative to the seat section 126, or may articulate relative to the seat section 126 in any manner. For instance, the fowler section 132 and/or the front section 138 may both pivot and translate relative to the seat section 126 in some configurations.

Caregiver interfaces 148, such as handles, help facilitate movement of the patient transport apparatus 102 over floor surfaces. Here, caregiver interfaces 148 may be coupled to the fowler assembly 128, the front assembly 134 (not shown), the intermediate frame 118, and the like. Additional caregiver interfaces 148 may be integrated into other components of the patient transport apparatus 102. The caregiver interfaces 148 are graspable by the caregiver to manipulate the patient transport apparatus 102 for movement.

Figure 3A:
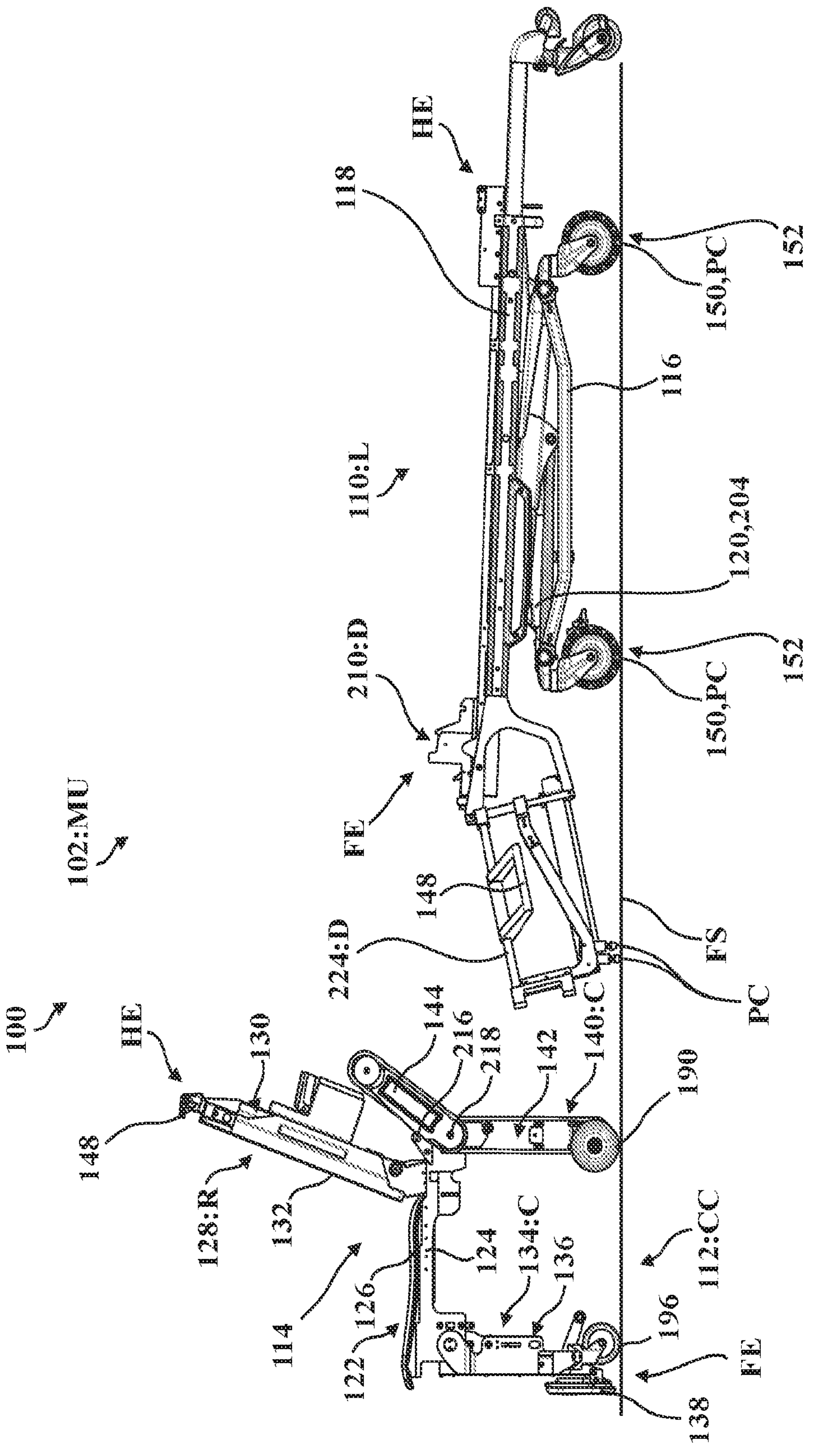
FIG. 3A is a side view of the patient transport apparatus of FIGS. 1A-2, shown with the base arranged in a lowered configuration and having a trolley disposed in a trolley docking position adjacent to the stabilizers shown in the deployed configuration, and with the litter arranged in the stair configuration adjacent to the stabilizers of the base.

Base wheels 150 are coupled to the base frame 116 to facilitate transport over floor surfaces, and facilitate supporting the base at respective contact points PC (see FIG. 3A). The base wheels 150 are arranged in each of four quadrants of the base 110 adjacent to corners of the base frame 116. In the illustrated versions, the base wheels 150 are caster wheels, which are able to rotate and swivel relative to the base frame 116 during transport. Each of the base wheels 150 forms part of a base caster assembly 152. Each base caster assembly 152 is mounted to the base frame 116. It should be understood that various configurations of base caster assemblies 152 are contemplated. In addition, in some configurations, the base wheels 150 are not caster wheels and may be non-steerable, steerable, non-powered, powered, or combinations thereof. Additional base wheels 150 are also contemplated. For example, the patient transport apparatus 102 may comprise four non-powered, non-steerable wheels, along with one or more powered wheels. In some cases, the patient transport apparatus 102 may not include any wheels. In other configurations, one or more auxiliary wheels (powered or non-powered), which are movable between stowed positions and deployed configurations, may be coupled to the base frame 116. In some cases, when these auxiliary wheels are located between caster assemblies and contact the floor surface FS in the deployed configuration, they cause two of the base caster assemblies 152 to be lifted off the floor surface thereby shortening a wheel base 110 of the patient transport apparatus 102. A fifth wheel may also be arranged substantially in a center of the base 110. Other configurations are contemplated.

It should be noted that in many of the drawings described herein, certain components of the patient transport apparatus 102 have been omitted from view for convenience of description and ease of illustration.

Figure 2:
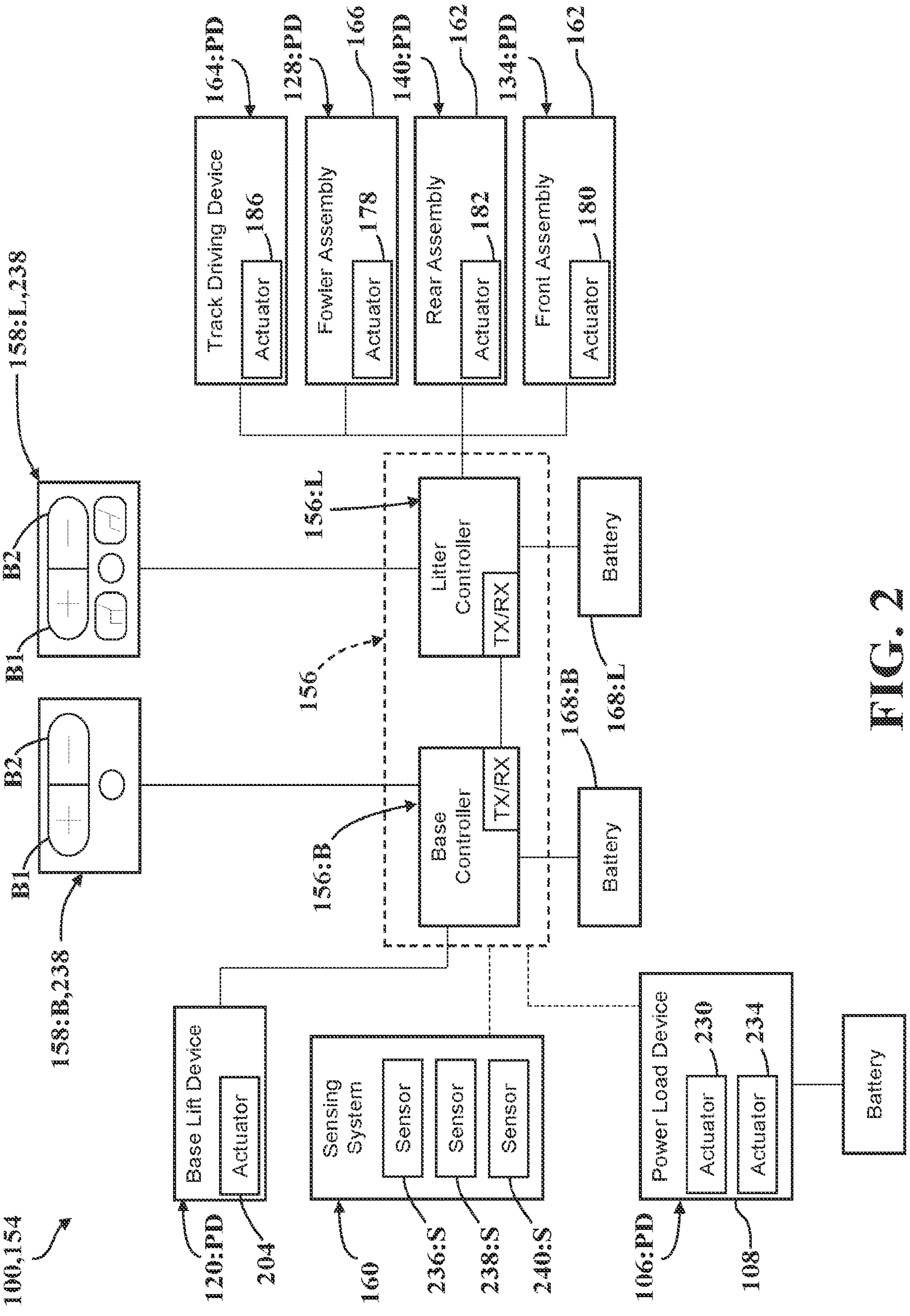
FIG. 2 is a schematic view of a control system of the patient transport apparatus of FIGS. 1A-1B.

Referring now to FIG. 2, a control system 154 of the patient transport apparatus 102 is shown schematically. The control system 154 generally comprises one or more powered devices PD operated by a base controller 156B and/or a litter controller 156L (collectively referred to herein as "controller 156") in response to actuation of a base user interface 158B and/or a litter user interface 158L (collectively referred to herein as "user interface 158") in response to state signals received from a sensing system 160. Each of these components will be described in greater detail below.

With continued reference to FIG. 2, each of the one or more powered devices PD of the control system 154 is configured to perform one or more predetermined functions. To this end, the powered devices PD employ one or more components that utilize electricity in order to perform functions. One or more powered devices PD of the patient support system 100 and/or the patient transport apparatus 102 may comprise powered adjustment devices, such as the power load device 108, the base lift device 120, a litter lift device 162, a track driving device 164, and a fowler section adjustment device 166. To this end, in some versions, the base 110 employs a base energy storage device 168B and the litter 112 employs a litter energy storage device 168L (collectively referred to herein as "energy storage device 168"). Other powered devices PD are also contemplated.

The powered devices PD may have many possible configurations for performing the predetermined functions of the patient transport apparatus 102. As will be appreciated from the subsequent description below, powered devices PD may cooperate with or otherwise form a part of the patient transport apparatus 102 in certain versions. Exemplary configurations of some of the powered devices PD are described in greater detail below. One or more actuators may be used to effectuate functions of each powered device PD. It should be understood that numerous configurations of the powered devices PD, other than those specifically described herein, are contemplated. Exemplary scenarios of how certain powered devices PD may be utilized are also described below. However, numerous other scenarios not described herein are also contemplated.

The litter 112 of the present disclosure is configured to be removably attached to the intermediate frame 118 of the base 110, as noted above and as is described in greater detail below, and is generally operable between: an undocked mode MU (see FIG. 1A) where the litter 112 supports the patient for movement independent of the base 110, and a docked mode MD (see FIG. 1B) where the litter 112 support the patient for movement concurrent with the base 110. The process of moving between the undocked mode MU and the docked mode MD is described in greater detail below in connection with FIGS. 3A-3G. While operating in the undocked mode MU, the litter 112 is operable between a loft configuration CL (see FIG. 7A), a chair configuration CC (see FIG. 7C), and a stair configuration CS (see FIGS. 7D-8). While operating in the docked mode MD, portions of the litter 112 may be articulable to adjust the patient support surface 114, such as by moving the fowler assembly 128. Other configurations are contemplated.

Figure 7A:
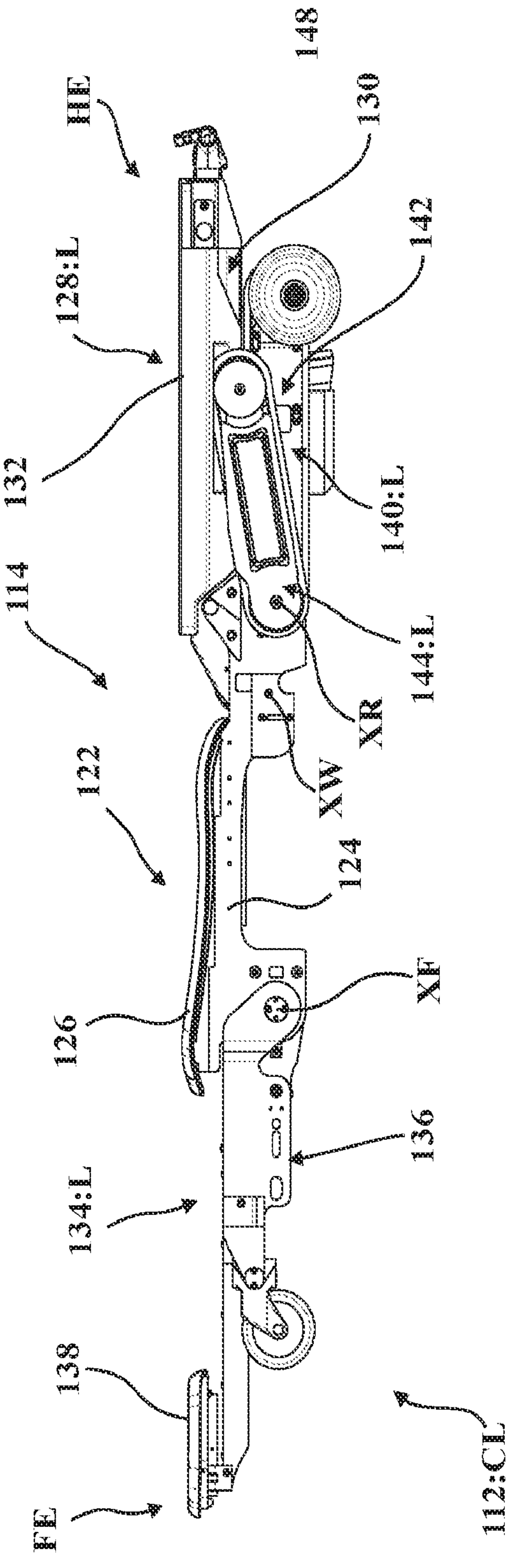
FIG. 7A is a side view of the litter of the patient transport apparatus of FIGS. 1A-6, shown arranged in a loft configuration.
Figure 7B:
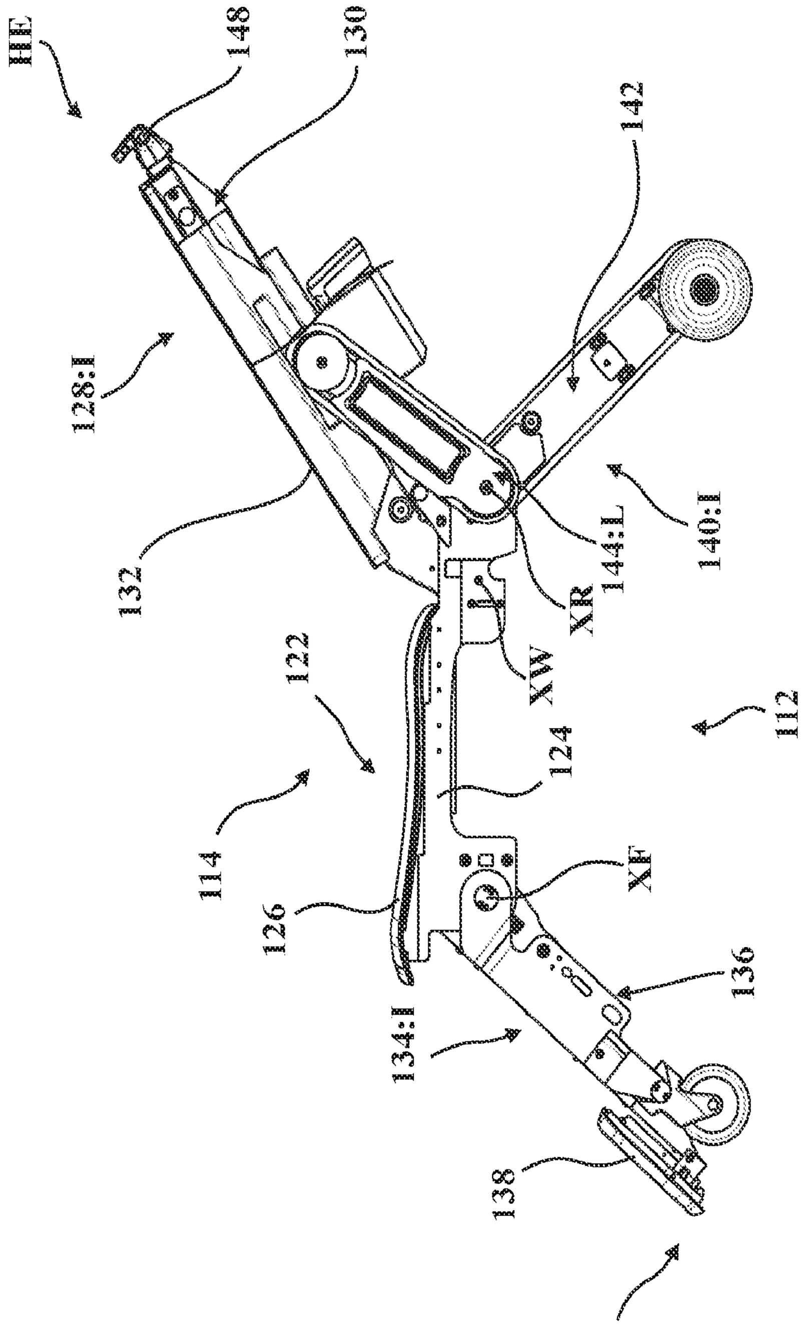
FIG. 7B is another side view of the litter of FIG. 7A shown transitioning between the loft configuration and the chair configuration.
Figure 7C:
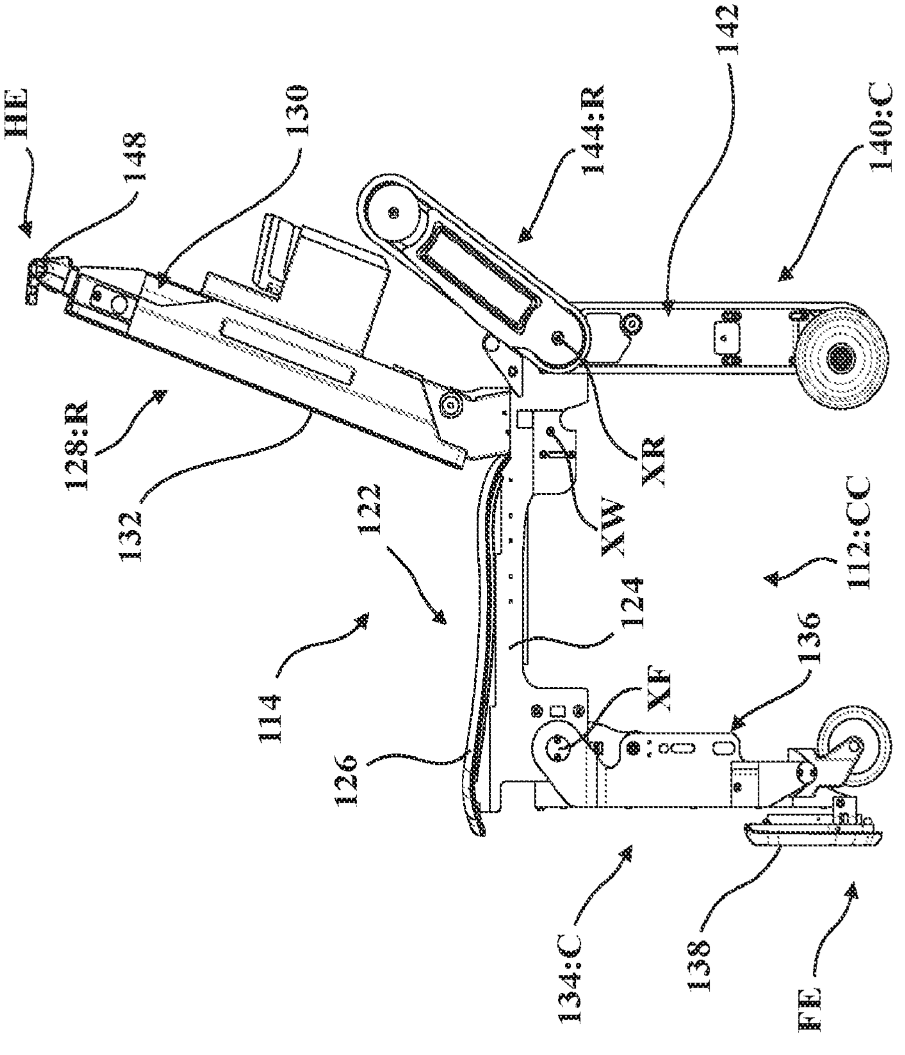
FIG. 7C is another side view of the litter of FIGS. 7A-7B shown arranged in the chair configuration.
Figure 7D:
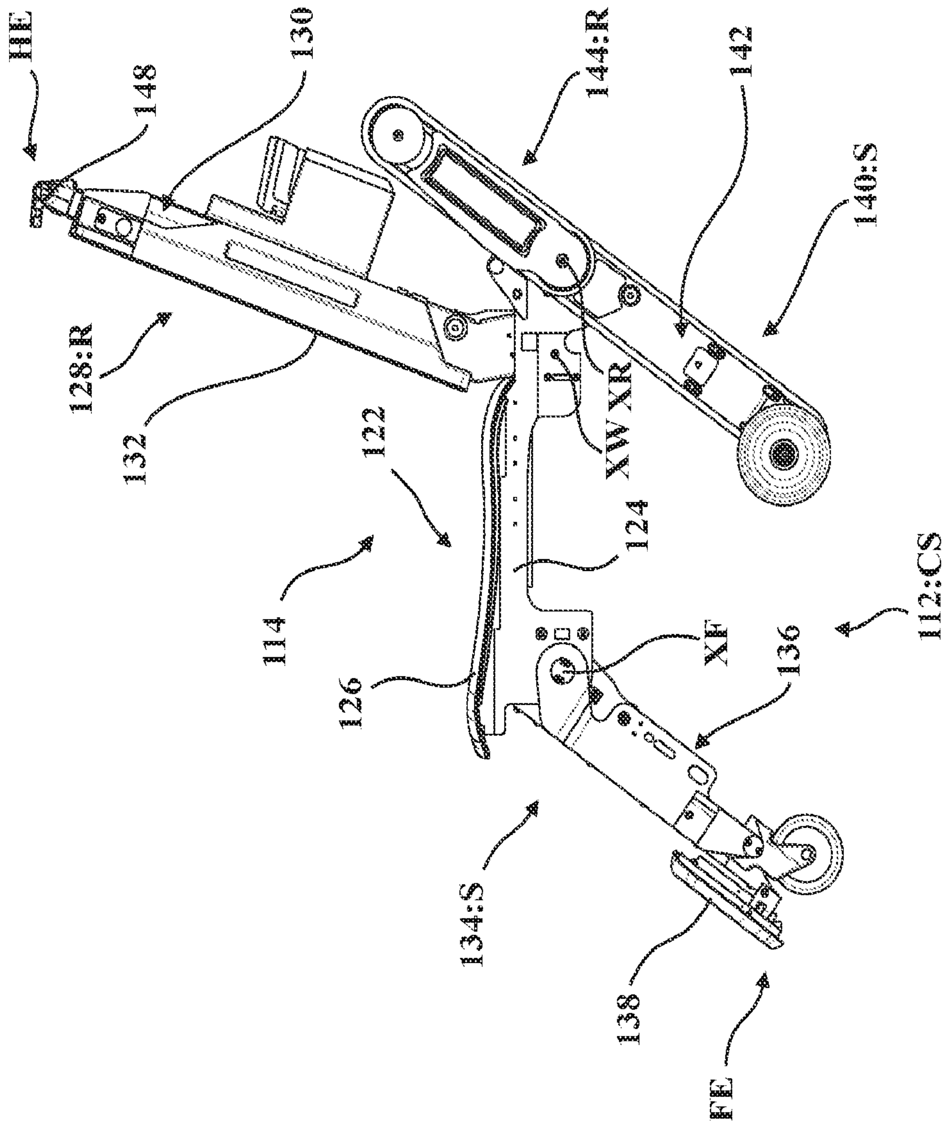
FIG. 7D is another side view of the litter of FIGS. 7A-7C shown arranged in a stair configuration.
Figure 8:
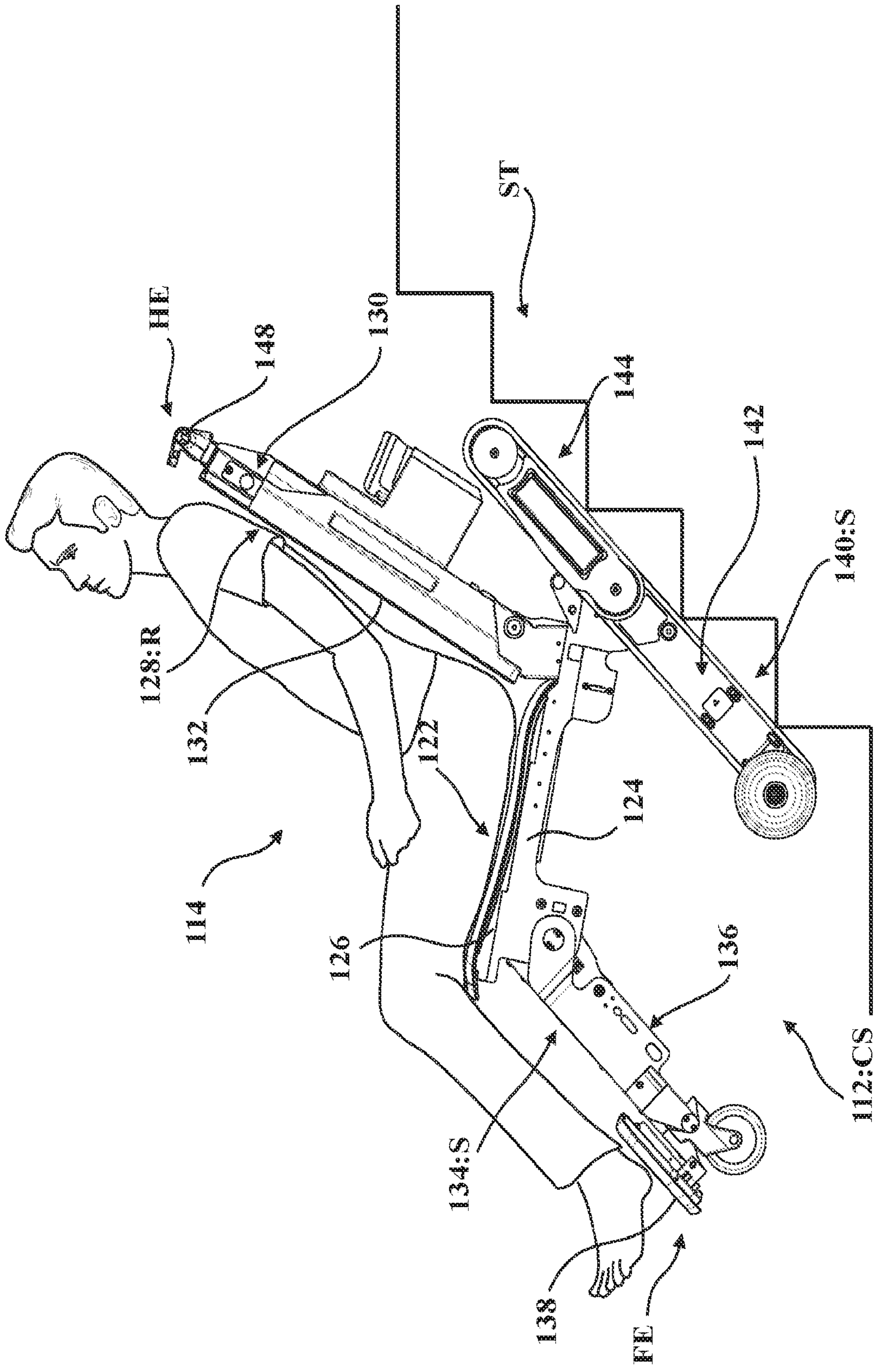
FIG. 8 is another side view of the litter of FIGS. 7A-7D shown arranged in the stair configuration supporting a patient for transport along stairs.

In the version shown in FIGS. 7C-8, when operating in and between the chair and stair configurations CC, CS, the litter 112 is configured to serve as a mobile chair to transport the patient along floor surfaces FS as well as up and down stairs ST. Mobile chairs (sometimes called "stair chairs") are used to evacuate patients from buildings where patient accessibility is limited, such as buildings having more than one floor. As noted above, the patient support surface 114 of the litter 112 of the illustrated patient transport apparatus 102 is generally defined by the fowler section 132, the seat section 126, and the front section 138. Here, the seat section 126 is supported by the seat frame 124, and the fowler section 132 is supported by the fowler frame 130 that is coupled to the seat frame 124 such that the fowler frame 130 may pivot or otherwise articulate relative to the seat frame 124. The front section 138 is supported by the front frame 136 which is coupled to the seat frame 124 such that the front frame 136 may pivot or otherwise articulate relative to the seat frame 124. Here too, the rear assembly 140 is coupled to the seat frame 124 such that the rear frame 142 may pivot or otherwise articulate relative to the seat frame 124.

In some configurations, the seat frame 124 may include seat frame members 170 spaced laterally apart from and fixed relative to each other. Similarly, the fowler frame 130 may include fowler frame members 172 spaced laterally apart and fixed relative to each other. The front frame 136 may include front legs 174 spaced laterally apart and fixed relative to each other, and the rear frame 142 may include rear legs 176 spaced laterally apart and fixed relative to each other. In the illustrated version, the litter 112 comprises a fowler actuator 178, a front actuator 180, and a rear actuator 182 which are each driven by the controller 156 (e.g., by the litter controller 156L) and are operatively attached to the seat assembly 122 to facilitate respectively pivoting or otherwise articulating the fowler assembly 128, the front assembly 134, and the rear assembly 140 relative to the seat assembly 122.

In the illustrated versions, the fowler assembly 128 is movable via the fowler actuator 178 between a fowler raised position 128R (see FIGS. 7D-7E), a fowler lowered position 128L (see FIG. 7A), and one or more intermediate fowler positions 1281 (see FIG. 7B) between the fowler raised position 128R and the fowler lowered position 128L.

As noted above, the illustrated patient transport apparatus 102 employs the track driving device 164, which is configured to assist users in traversing a flight of stairs ST by mitigating the load users (e.g., caregivers) would otherwise be required to lift via caregiver interfaces 148 (see FIG. 8; not shown in detail). In some configurations, the track driving device 164 may be configured to move the litter 112 across the floor surface FS (not shown). The track driving device 164 is formed as a part of the rear legs 176 of the rear assembly 140. Here, each rear leg 176 includes a respective track frame member 184 coupled to the seat frame 124 for pivoting movement about the rear axis XR. The track driving device 164 also includes track actuators 186 which drive continuous leg tracks 188 rotatably coupled to the respective leg track frame members 184. The track actuators 186 are coupled to the track frame members 184 and are coupled to (or otherwise disposed in communication with) the controller 156 to drive the leg tracks 188 for ascending and descending stairs ST (see FIG. 8). The track driving device 164 may be configured to operate in the same manner or a similar manner as those shown in U.S. Pat. Nos. 7,398,571, 9,486,373, 9,510,981, and/or U.S. Patent Application Publication No. 2018/0028383, previously referenced.

The rear assembly 140 also includes rear wheels 190 rotatably coupled to each of the track frame members 184 that are configured to be disposed in contact with the floor surface FS, such as to support the litter 112 for movement in the chair configuration CC. In the illustrated versions, the rear wheels 190 are freely rotatable. In alternative versions, the rear wheels 190 may be powered drive wheels coupled to the controller 156. Other configurations are contemplated. The components of the track driving device 164 are arranged such that the leg track frame members 184, the leg tracks 188, and the rear wheels 190 move together with the rear assembly 140 which, as noted above, is arranged to selectively pivot about the rear axis XR to facilitate changing between the various configurations of the litter 112 as well as to facilitate docking and undocking from the base 110. As will be described in greater detail below, the rear assembly 140 is movable via the rear actuator 182 between a rear assembly loft position 140L (see FIG. 7A), a rear assembly chair position 140C (see FIG. 7C), a rear assembly stair position 140S (see FIGS. 7D-8), a rear assembly dock position 140D (see FIG. 3D), and one or more intermediate rear assembly positions 140I (see FIG. 7B) between the rear assembly loft position 140L and the rear assembly dock position 140D.

In some versions, the ski assemblies 144 serve as extensions to the track driving device 164 and likewise help facilitate engagement with stairs ST. To this end, in the illustrated versions, the ski assemblies 144 each include respective ski track frame members 192 operatively attached to the seat frame 124 for pivoting movement about the rear axis XR (or another axis). Here too, the track actuators 186 drive continuous ski tracks 194 rotatably coupled to the respective ski track frame members 192. In some versions, the ski assemblies 144 are arranged for pivoting movement between a plurality of ski positions, including a raised ski position 144R (see FIGS. 7C-7D), a lowered ski position 144L (see FIG. 7A), and one or more intermediate ski positions 144I between the raised ski position 144R and the lowered ski position 144L (see FIG. 7B). In some versions, abutment with the fowler assembly 128 moves the ski assemblies 144. However, other configurations are contemplated.

The front legs 174 of the front assembly 134 support respective front wheels 196, which are realized as part of respective front caster assemblies 198 arranged to facilitate movement of the litter 112 in the chair configuration CC (see FIGS. 5-6 and 7C), as well as to facilitate transitioning between the chair configuration CC and the stair configuration CS (compare FIGS. 7C-7D). In the illustrated versions, the front wheels 196 are freely rotatable, but could be motorized, braked, and the like in some versions. As noted above, in some versions, the front section 138 may be translatable along the front frame 136, such as when the litter 112 moves between the loft configuration CL and the chair configuration CC (compare FIGS. 7A-7D), and/or when the litter 112 operates in the docked mode MD (see FIG. 4A). To this end, the front assembly 134 may include an extension mechanism, generally indicated at 200, configured to longitudinally position the front section 138 relative to the front legs 174. While not depicted in detail herein, the extension mechanism 200 may be similar to as is described in U.S. patent application Ser. No. 16/705,878, the disclosure of which is incorporated by reference in its entirety. As will be described in greater detail below, the front assembly 134 is movable via the front actuator 180 between a front assembly loft position 134L (see FIG. 7A), a front assembly chair position 134C (see FIG. 7C), a front assembly stair position 134S (see FIGS. 7D-8), and one or more intermediate front assembly positions 1341 (see FIG. 7B) between the front assembly loft position 134L and the front assembly dock position 134D.

The litter lift device 162 is coupled to the litter 112 and is configured to raise and lower the patient between minimum and maximum heights of the litter 112, and to generally facilitate movement between the loft configuration CL, the chair configuration CC, and the stair configuration CS when the litter 112 is separated from the base 110 (see FIGS. 7A-7D). To this end, the illustrated litter lift device 162 generally includes the front actuator 180 and the rear actuator 182. The base lift device 120 is coupled to the base 110 and is configured to raise and lower the patient between a plurality of vertical configurations including a maximum raised configuration 110R (see FIG. 1B), a maximum lowered configuration 110L (see FIG. 1A), and a plurality of vertical configurations therebetween, both while the litter 112 is supported by the base 110 and, in some versions, while the litter 112 is undocked from the base 110.

In the representative version illustrated in FIGS. 1A-1B, the base 110 comprises one or more lift arms 202 coupling the intermediate frame 118 to the base frame 116. The base lift device 120 comprises one or more base lift actuators 204 coupled to at least one of the base frame 116 and the intermediate frame 118 to raise and lower the intermediate frame 118 and litter 112 relative to the floor surface FS and the base frame 116. The base lift device 120 may be configured to operate in the same manner or a similar manner as the lift mechanisms shown in U.S. Pat. Nos. 7,398,571, 9,486,373, 9,510,981, and/or U.S. Patent Application Publication No. 2018/0028383, previously referenced.

The base 110 of the patient transport apparatus 102 also generally includes a docking subassembly 206 operatively coupled to the intermediate frame 118. Here, the docking subassembly 206 includes intermediate rails 208 which support a trolley 210 for translation between a trolley forward position 210F where the trolley 210 is arranged at the head end HE of the base 110, and a trolley docking position 210D where the trolley 210 is arranged at the foot end FE of the base 110. The trolley 210 includes or otherwise defines upper and lower pin stops 212, 214 which are arranged to engage against respective upper and lower pins 216, 218 of the litter 112 in order to support the litter 112 in a cantilevered position CP during the process of docking the litter 112 to the base 110, as well as to support the litter 112 to the base 110 when operating in the docked mode MD. The docking subassembly 206 also generally includes a forward trolley lock mechanism 220 to inhibit movement of the trolley 210 away from the trolley forward position 210F, and a dock trolley lock mechanism 222 to inhibit movement of the trolley 210 away from the trolley docking position 210D, in order to facilitate transitioning between the undocked mode MU and the docked mode MD as described in greater detail below.

In the illustrated version, the base 110 also includes a stabilizer 224 operatively attached to the foot end FE of the intermediate frame 118 and configured for movement between a retracted configuration 224R (see FIGS. 3F-3G) where the stabilizer 224 is disposed in spaced relation from the floor surface FS, and a deployed configuration 224D (see FIGS. 3A-3E) where the stabilizer 224 engages the floor surface to brace the base 110 at an additional point of contact PC with the floor surface FS to stabilize the base 110 when the litter 112 is in the cantilevered position CP (see FIG. 3D) during the process of docking the litter 112 to the base 110.

Figure 4B:
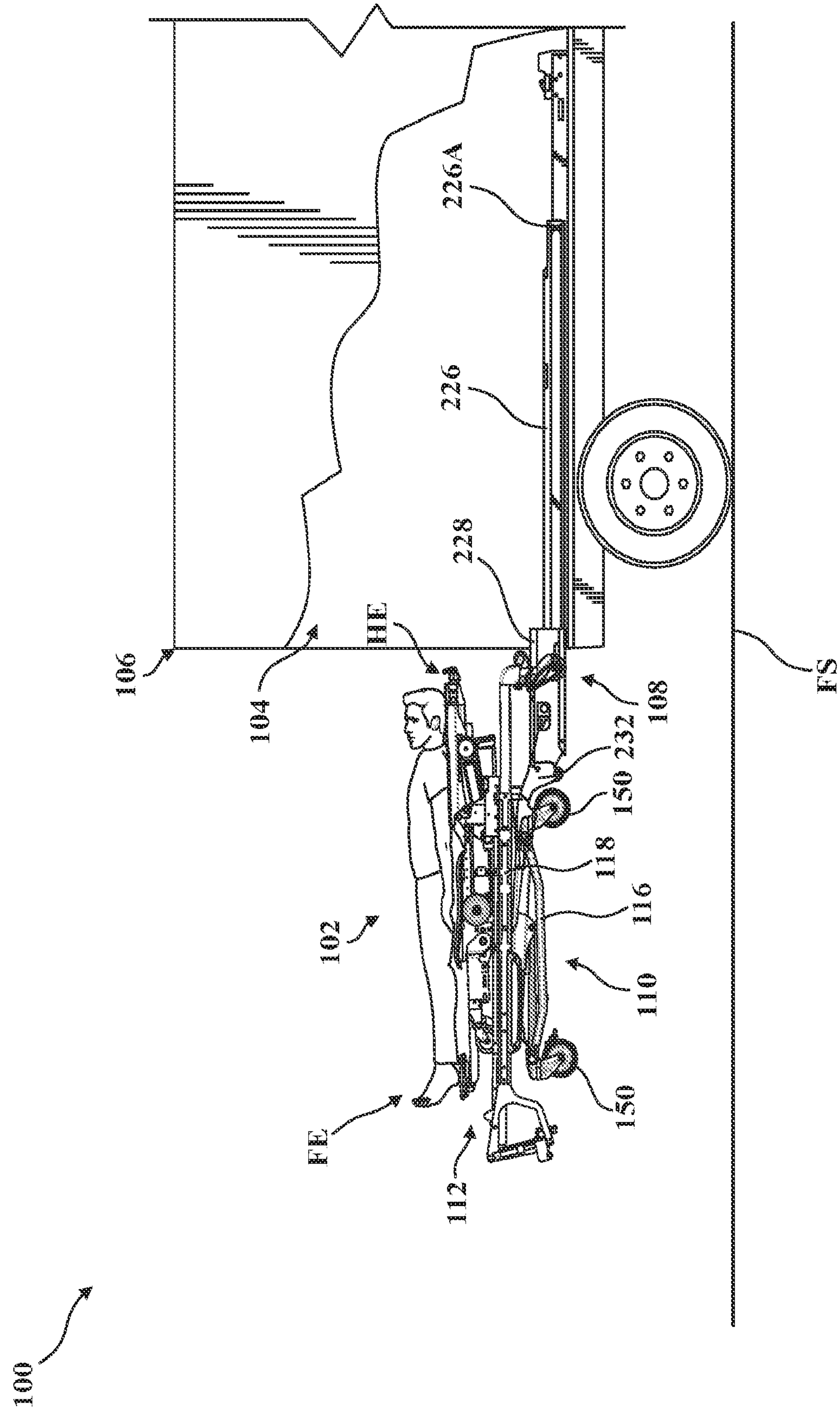
FIG. 4B is another side view of the patient transport apparatus and the ambulance of FIG. 4A, shown with the base arranged in a lowered position secured to the power load device adjacent to the cargo area of the ambulance.
Figure 4C:
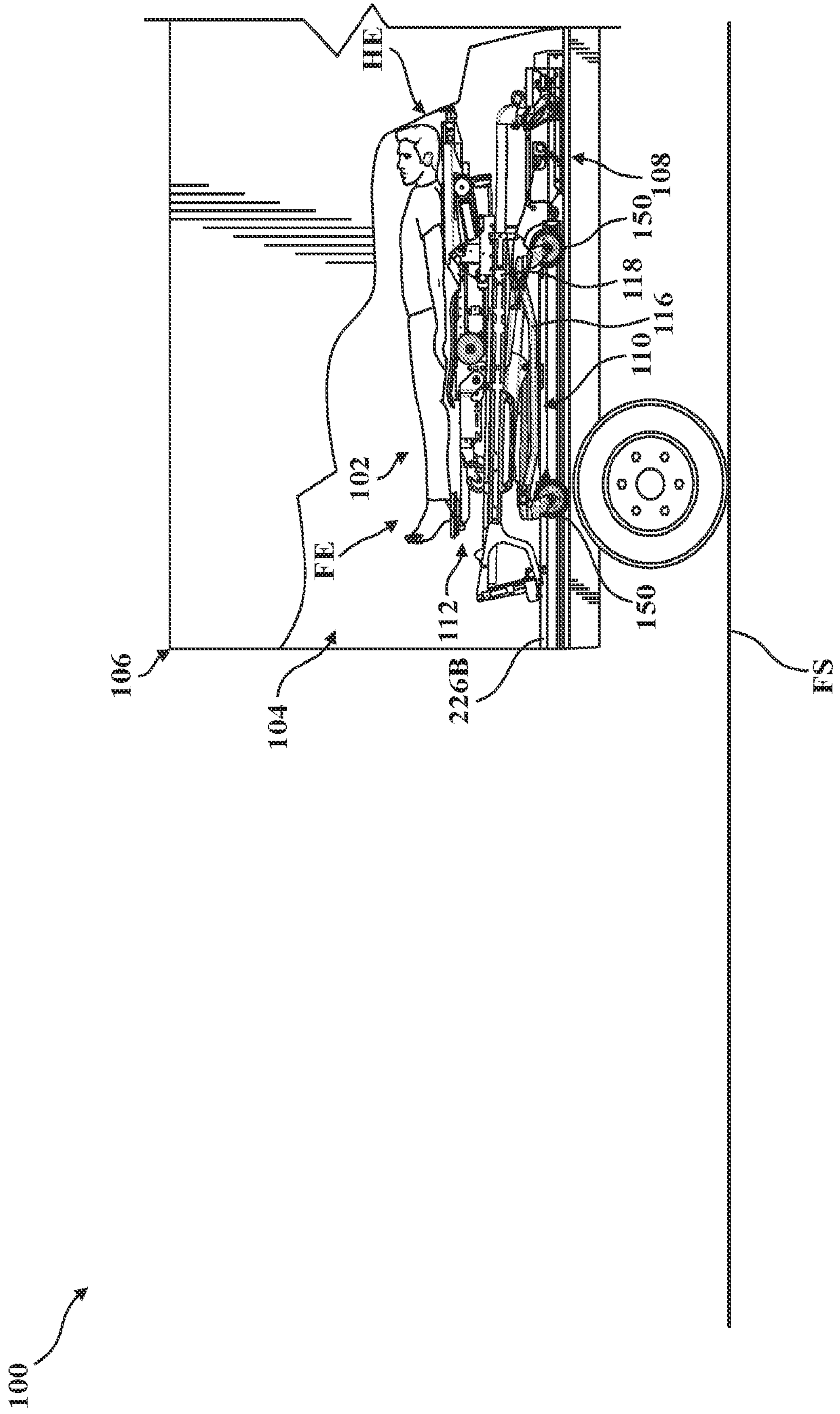
FIG. 4C is another side view of the patient transport apparatus and the ambulance of FIGS. 4A-4B, shown with the power load device retracted together with the patient transport apparatus into the cargo area of the ambulance.

As is shown in FIGS. 4A-4C and depicted schematically in FIG. 2, the power load device 108 is coupled to the ambulance 106 and is configured to load and unload the patient transport apparatus 102 into and out of the ambulance 106 when the power load device 108 is coupled to at least one of the litter 112 and the base 110. In this exemplary version, the power load device 108 of the patient support system 100 is realized as a powered device PD that can be driven by the controller 156 without necessarily forming a part of the patient transport apparatus 102. The power load device 108 generally comprises a rail 226 coupled to the ambulance. The rail 226 comprises a first rail end 226A at the back of the ambulance 106 where patients are loaded (e.g., the cargo area 104), and extends to a second rail end 226B toward the front of the ambulance 106.

The power load device 108 further includes a rail trolley 228 coupled to the rail 226. The rail trolley 228 is movable along a length of the rail 226. The power load device 108 also includes a trolley actuator 230 coupled to the rail 226 and the rail trolley 228 to move the rail trolley 228 along the length of the rail 226, and load arms 232 configured to pivot or otherwise articulate relative to the rail trolley 228 in order to support the patient transport apparatus 102 when at least one of the litter 112 and the base 110 are coupled to the rail trolley 228. The power load device 108 further includes an arm actuator 234 coupled to the rail trolley 228 and the load arms 232 to pivot or otherwise articulate the load arms 232 relative to the rail trolley 228. When the rail trolley 228 is coupled to at least one of the litter 112 and the base 110, the power load device 108 is coupled to or otherwise disposed in communication with the controller 156 to be controlled by the controller 156. The power load device 108 may be powered by a power source supplied by the ambulance 106 and/or by a power source on the patient transport apparatus 102. In some versions, the power load device 108 of the patient support system 100 is configured as described in U.S. Pat. No. 8,439,416, which is hereby incorporated by reference in its entirety.

As noted above, the control system 154 is provided to control operation of the one or more powered devices PD which form a part of or otherwise cooperate with the patient transport apparatus 102. To this end, the controller 156 may employ one or more microprocessors for processing instructions or an algorithm stored in memory to control operation of the one or more powered devices PD. Additionally, or alternatively, the controller 156 may comprise one or more microcontrollers, field programmable gate arrays, systems on a chip, discrete circuitry, and/or other suitable hardware, software, and/or firmware that is capable of carrying out the functions described herein. The controller 156 may be carried on-board the patient transport apparatus 102, or may be remotely located. The controller 156 may comprise one or more subcontrollers configured to control the one or more powered devices PD, and/or one or more subcontrollers for each of the one or more powered devices PD. In some cases, one subcontroller may be attached to the litter 112 and another subcontroller may be attached to the base 110. Power to the one or more powered devices PD and/or the controller 156 may be provided by the energy storage device 168. In alternative configurations, the one or more powered devices PD and/or the controller 156 may be provided by an external power source.

The controller 156 is coupled to the one or more powered devices PD in a manner that allows the controller to control the powered devices PD (e.g., via electrical communication). The controller 156 may communicate with the one or more powered devices PD via wired or wireless connections. In some versions, the controller 156 may generate and transmit control signals to the one or more powered devices PD, or components thereof, to drive or otherwise facilitate operating their associated actuators or to cause the one or more powered devices PD to perform one or more of their respective functions.

In addition to controlling operation of the one or more powered devices PD, in some versions, the controller 156 also determines current and desired states of the litter 112 and/or the base 110 based on input signals that the controller 156 receives from user interfaces 158 and/or based on state signals that the controller 156 receives from the sensing system 160. The state of the litter 112 and/or the base 110 may be a position, a relative position with respect to another object or component, an orientation, a configuration, an angle, a speed, a load condition, an energization status, or any other state of the litter 112 and/or the base 110.

The sensing system 160 comprises a state detection device 236 that is coupled to the litter 112 and the controller 156 and monitors the state of the litter 112 directly, or indirectly. The state detection device 236 comprises one or more sensors S configured to monitor the litter 112, the base 110, and/or the one or more powered devices PD. To this end, the state detection device generates a state signal corresponding to the state of the litter 112 and sends the state signal to the controller, such as when the litter 112 is mounted to the base 110.

The state detection device and/or other aspects of the sensing system 160 may be used by the controller for various purposes. The sensing system 160 may comprise one or more sensors S, including force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. The sensing system 160 may further comprise one or more sensors S to detect mechanical, electrical, and/or electromagnetic coupling between components of the patient transport apparatus 102. Other types of sensors S are also contemplated. Some of the sensors S may monitor thresholds movement relative to discrete reference points. The sensors S can be located anywhere on the patient transport apparatus 102, or remote from the patient transport apparatus 102. For example, the sensors S may be located on or in the patient support surface 114, the base frame 116, the intermediate frame 118, or other suitable locations.

In some configurations, the sensing system 160 may act as an input device used to provide input signals to the controller 156 to cause or continue operation of the one or more powered devices PD. Numerous scenarios exist in which the one or more powered devices PD can be operated based on input signals provided by the sensing system 160 and/or the user interface 158.

In one configuration, the sensing system 160 indicates when the function being performed has been completed by the one or more powered devices PD. By way of non-limiting example, adjustment of one or more powered devices PD may be interrupted or stopped because a minimum or maximum position of the one or more powered devices PD has been reached, such as by using a sensor S realized as a mechanical limit switch, a membrane switch, and the like.

In certain versions, the sensing system 160 may include a state input device 238 to enable a user (e.g., a caregiver) to select a state such that actuation of the state input device 238 generates the state signal. In this case, instead of the controller 156 automatically detecting the current state of the litter 112, a user can manually enter the current state (or, in some versions, a desired state) of the litter 112 (e.g., "litter-on-base," "litter-off-base," etc.). In some configurations, the state input device 238 is spaced from at least one of the user interfaces 158. In other configurations, the state input device 238 is connected to at least one of the user interfaces 158.

One or more user interfaces 158 are coupled to the controller 156 and may be actuated by the user (e.g., a caregiver) to transmit corresponding input signals to the controller 156, and the controller 156 controls operation of the one or more powered devices PD based on the input signals and the state signals. Operation of the one or more powered devices PD may continue until the user discontinues actuation of the user interface 158, (e.g., until the corresponding input signal is terminated). Other configurations are contemplated.

The user interface 158 may comprise devices capable of being actuated by the user, and may be configured to be actuated in a variety of different ways, including but not limited to, mechanical actuation (hand, foot, finger, etc.), hands-free actuation (voice, foot, etc.), and the like. The user interface 158 may comprise one or more of a load cell, a push button, a touch screen, a joystick, a twistable control handle, a dial, a knob, a gesture sensing device for monitoring motion of hands, feet, face, or other body parts of the user (such as through a camera), a microphone for receiving voice activation commands, a foot pedal, and a sensor (e.g., infrared sensor such as a light bar or light beam to sense a user's body part, ultrasonic sensor, etc.). Additionally, buttons/pedals may be physical buttons/pedals, or may be virtually-implemented buttons/pedals such as through optical projection or forming part of a graphical user interface presented on a touchscreen. Buttons/pedals may also be mechanically-implemented in some versions, or may drive-by-wire type buttons/pedals where a user-applied force actuates a sensor S such as a switch or potentiometer. User interfaces 158 may be provided in one or more locations on the base 110 and/or the litter 112. Other configurations are contemplated.

In some versions of the patient transport apparatus 102, the user interface 158 may comprises two buttons B1, B2 that may be actuated to generate the input signal used by the controller 156 to drive the one or more powered devices PD. In other versions, the user interface 158 may comprise three or more buttons. In some versions, the user interface 158 may comprise a single button. Other configurations are contemplated.

As will be appreciated from the subsequent description below, individual buttons B, B (or "input controls") of the user interface 158 may be used to control functions of or associated with more than one powered device PD. The user interfaces 158 generate input signals corresponding to each individual button B1, B2 of the user interface, when actuated. In order to operate different powered devices PD, the input signal received by the controller 156 may not change when the same button B1, B2 is actuated; rather, the state signals generated by the state detection device 236 may change according to the current state of the litter 112 and/or the base 110 such that the controller 156 determines which of the powered devices PD to actuate base **110*d* on the current state detected using the input signal from the same button B1, B2. Put differently, the same button B1, B2 can be used to control different powered devices PD depending on the state determined by the controller 156 via the sensing system 160, the state detection device 236, and/or the state input device 238. By way of non-limiting example, the user may actuate a button B1 on the user interface to operate the base lift device 120 when the litter 112 is in a first state, and the same button B1 may be actuated to operate the track driving device 164 when the litter 112** is in a second state. Other configurations are contemplated.

In one version, the sensing system 160 comprises a load detection device 240 coupled to the base 110. The load detection device 240 is configured to detect when the intermediate frame 118 is subjected to a load, such as load created by the litter 112 or load created by the litter 112 and the patient. More specifically, the load detection device 240 detects when a load has exceeded a load threshold. When the intermediate frame 118 is subject to a load below the load threshold, the base lift actuator 204 raises and lowers the intermediate frame 118 relative to the base frame 116 in response to actuation of the user interface 158 at a first rate. When the intermediate frame 118 is subjected to a load at or above the load threshold, the base lift actuator 204 raises and lowers the intermediate frame 118 relative to the base frame 116 in response to actuation of the user interface 158, at a second rate slower than the first rate. In the illustrated version, the base lift actuator 204 comprises a linear actuator. Here, the state detection device 236 comprises a sensor S to detect the litter 112 being coupled to and supported by the base 110. In this case, the current state of the litter 112 is considered to be a "litter-on-base" state. In response to detection via the sensor S, the state detection device 236 generates a corresponding state signal that is received by the controller 156; here in the "litter-on-base" state, when a user actuates the first button B1 of one of the user interfaces 158, the controller 156 is configured to operate the base lift actuator 204 to raise the litter 112 and the intermediate frame 118 relative to the floor surface and the base frame 116. Conversely, in the "litter-on-base" state, when the user actuates the second button B2 of the user interface 158, the controller 156 is configured to operate the base lift actuator 204 to lower the litter 112 and the intermediate frame 118 relative to the floor surface and the base frame 116. It will be appreciated that the forgoing represents examples of operation of the state detection device 236 and the state input device 238, and that other configurations are contemplated.

As noted above, the litter 112 is operable in the docked mode MD (see FIG. 1B) and in the undocked mode MU (see FIG. 1A). Referring now to FIG. 3A, when in the undocked mode MU, the litter 112 may be disposed adjacent to the base 110, with the litter 112 placed in the chair configuration CC. Here, the chair configuration CC is defined by the fowler assembly 128 being in the fowler raised position 128R, the front assembly 134 being in the front assembly chair position 134C, and with the rear assembly 140 being in the rear assembly chair position 140C. More specifically, here in the chair configuration CC, the fowler raised position 128R places the fowler section 132 relative to the seat section 126 to support the patient in a seated configuration (not shown in detail). Here too, in the chair configuration CC, the front section 138 is arranged to abut the patient's legs, feet, and the like, and the front frame 136 is arranged substantially parallel to the rear frame 142 in a generally vertical configuration with the front wheels 196 and the rear wheels 190 engaging the floor surface FS. Here too in FIG. 3A, the base 110 is shown in the maximum lowered configuration 110L with the stabilizer 224 disposed in the deployed configuration 224D to brace the base 110, and with the litter 112 disposed at the foot end FE of the base 110. In this arrangement, the litter 112 is disposed adjacent to the base 110 and is positioned such as to begin the process of docking.

Figure 3B:
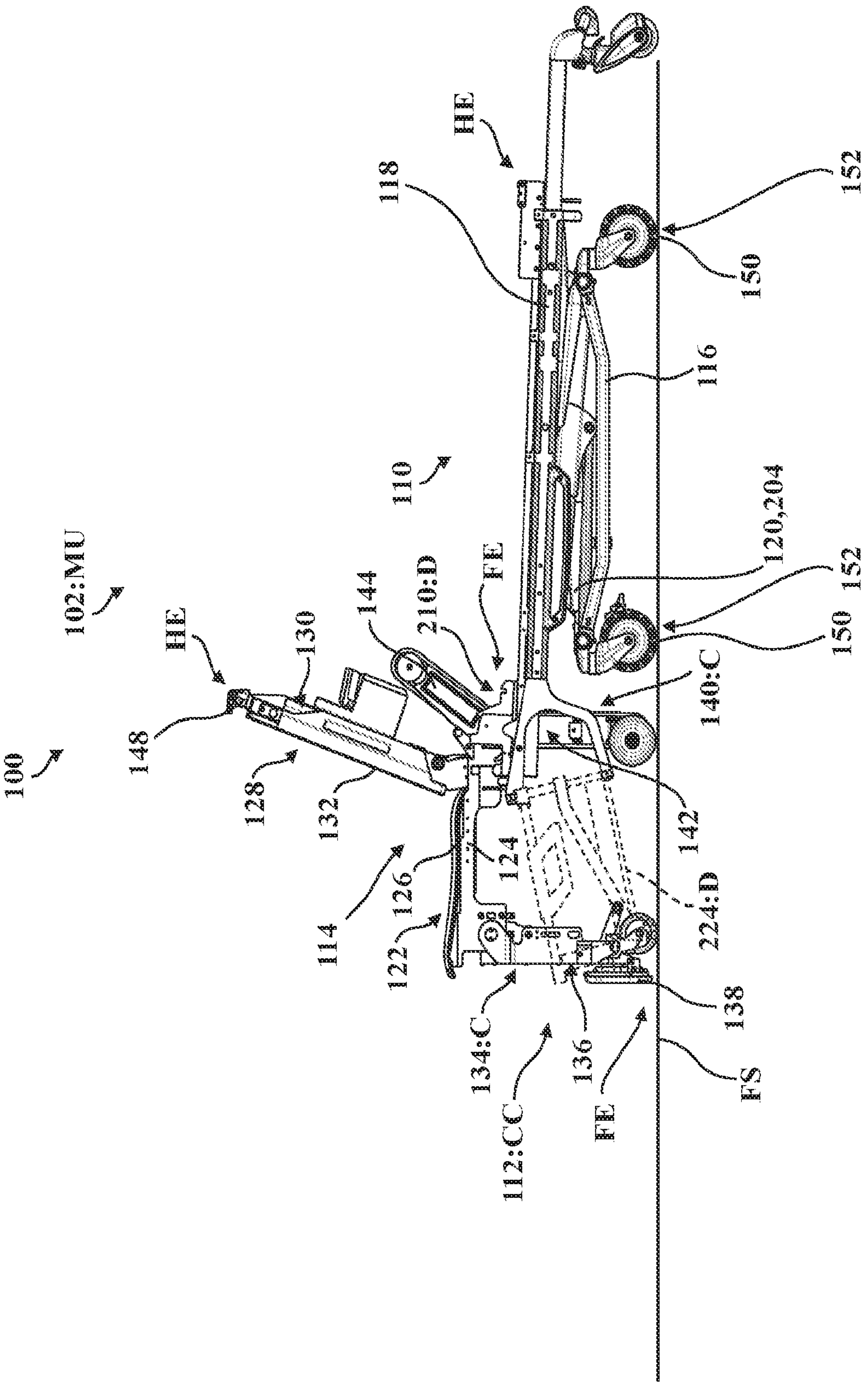
FIG. 3B is another side view of the patient transport apparatus of FIGS. 1A-3A, shown with the litter positioned for engagement with the trolley of the base adjacent to the stabilizers.

Continuing from FIG. 3A to FIG. 3B, the litter 112 is shown having been positioned longitudinally closer to the base 110, bringing the upper and lower pins 216, 218 into proximity of the trolley 210. Here, the sensing system 160 determines the relative positioning of the litter 112, and the controller 156 can be used to begin the process of docking by first actuating the rear actuator 182 to move the rear assembly 140 from the rear assembly chair position 140C towards the rear assembly dock position 140D in order to lower the upper and lower pins 216, 218 into engagement with the upper and lower pin stops 212, 214 of the trolley 210.

Figure 3C:
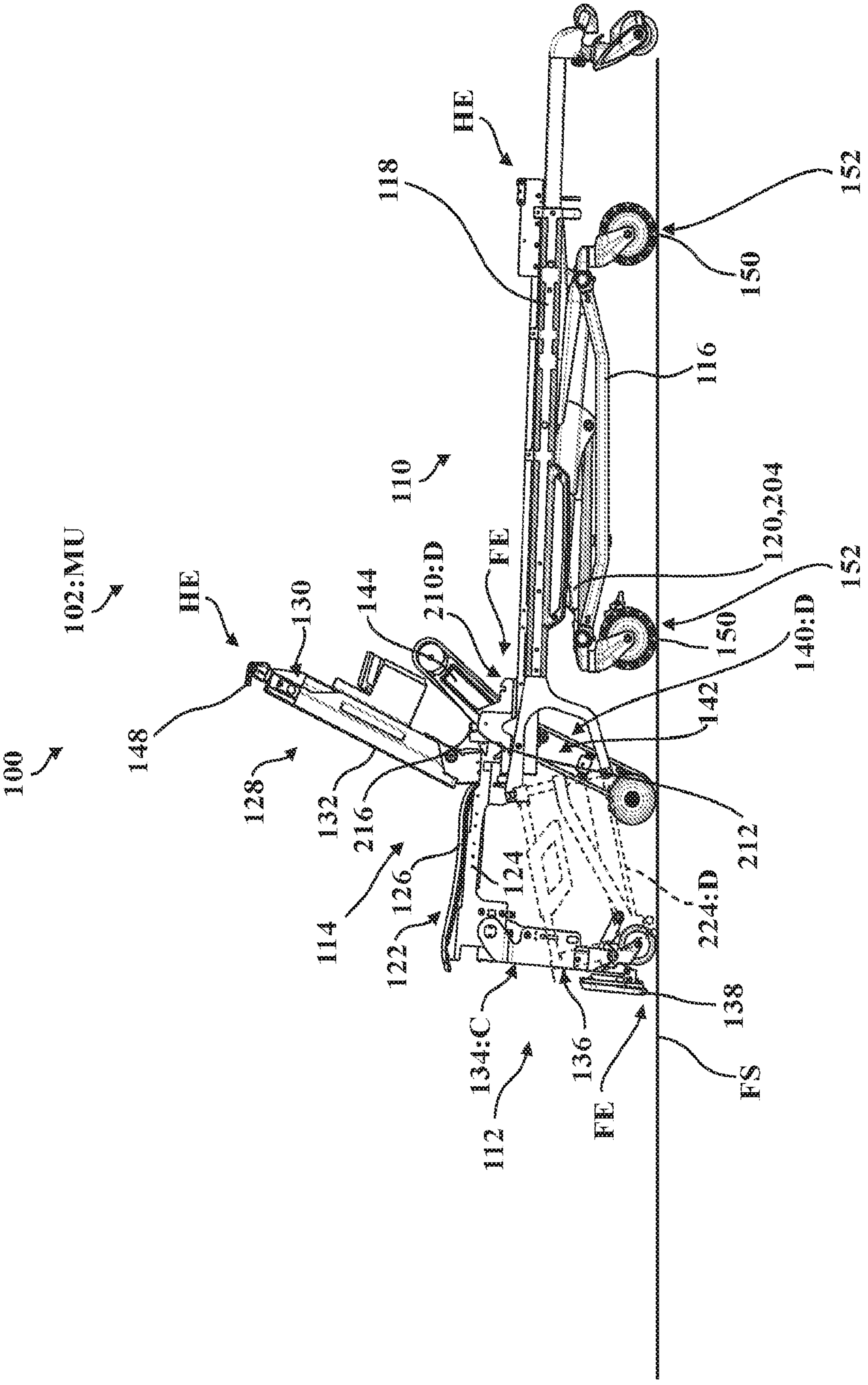
FIG. 3C is another side view of the patient transport apparatus of FIGS. 1A-3B, shown with a rear assembly of the litter pivoting the litter relative to the trolley to transfer weight between the litter and the base.

It will be appreciated that the arrangement of the rear assembly 140 as shown in FIG. 3C is such that the pivoting of the rear assembly 140 about the rear axis XR has moved the rear wheel 190 closer towards the front assembly 134 and has resulted in the seat assembly 122 having "tilted" backwards, which facilitates the process of transferring weight to the base 110. Here too, it will be appreciated that the rear assembly 140 is arranged for movement from the rear assembly chair position 140C (see also FIG. 7C) towards the rear assembly dock position 140D, as well as from the rear assembly chair position 140C towards the rear assembly stair position 140S (see also FIG. 7D) when pivoting about the rear axis XR to move the rear wheel 190 closer towards the front assembly 134. However, the rear assembly 140 is also arranged for movement from the rear assembly chair position 140C (see also FIG. 7C) towards the rear assembly loft position 140L (see FIG. 7A) when pivoting about the rear axis XR to move the rear wheel 190 further away from the front assembly 134.

Figure 3D:
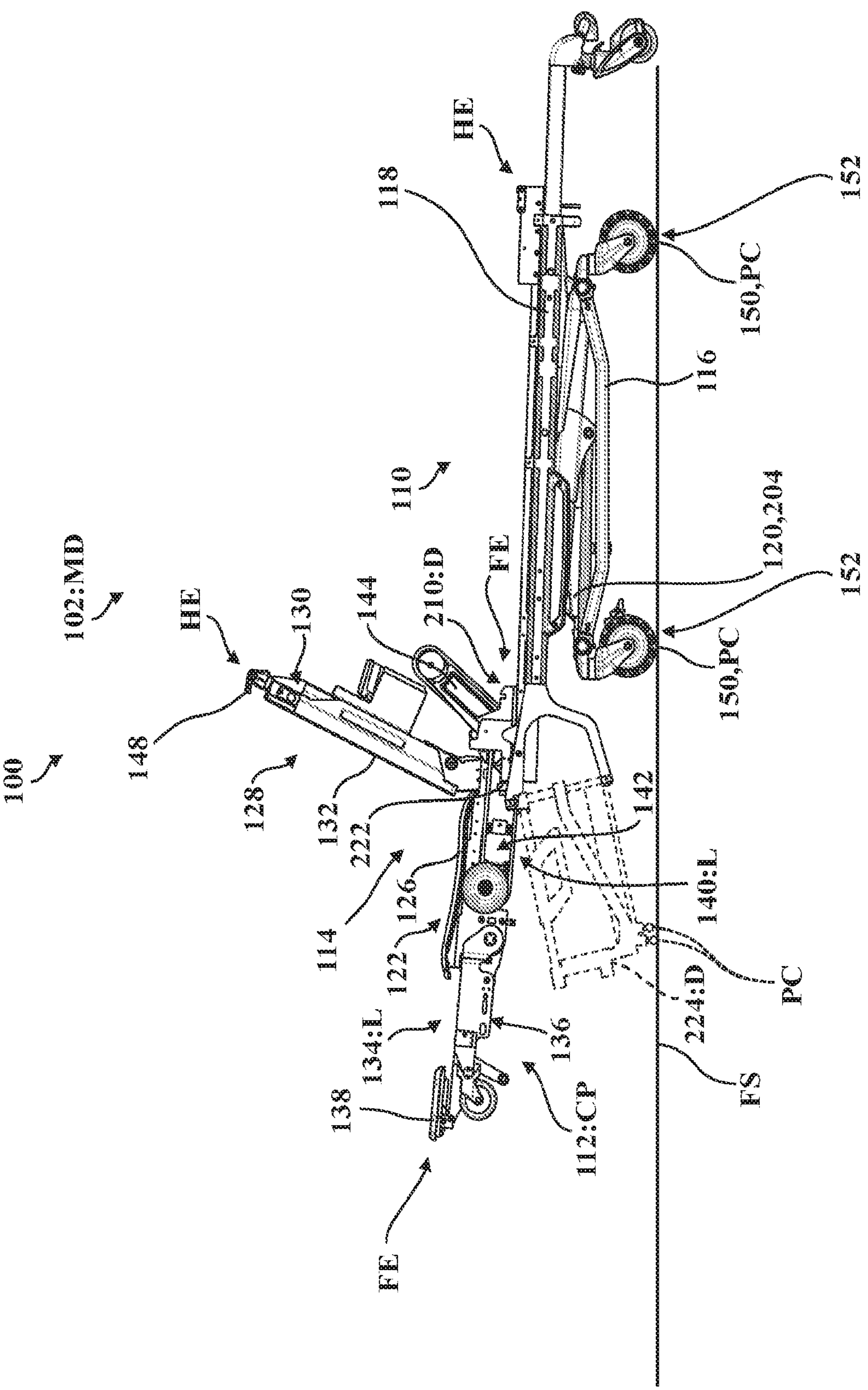
FIG. 3D is another side view of the patient transport apparatus of FIGS. 1A-3C, shown with the litter operating in a cantilevered position where a front assembly and the rear assembly of the litter are pivoted off of the floor surface to transfer weight from the litter onto the base, the base shown braced via the stabilizers.

With continued reference to FIG. 3C, once the controller 156 has determined that the lower the upper and lower pins 216, 218 have come into engagement with the upper and lower pin stops 212, 214 of the trolley 210, the controller 156 drives the rear actuator 182 to pivot the rear assembly 140 about the rear axis XR until it reaches the a rear assembly dock position 140D and, at the same time, drives the front actuator 180 to pivot the front assembly 134 about the front axis XF from the front assembly chair position 134C to the front assembly loft position 134L as shown in FIG. 3D. Here, it will be appreciated that the rear actuator 182 and the front actuator 180 may be driven simultaneously by the controller 156.

Figure 3E:
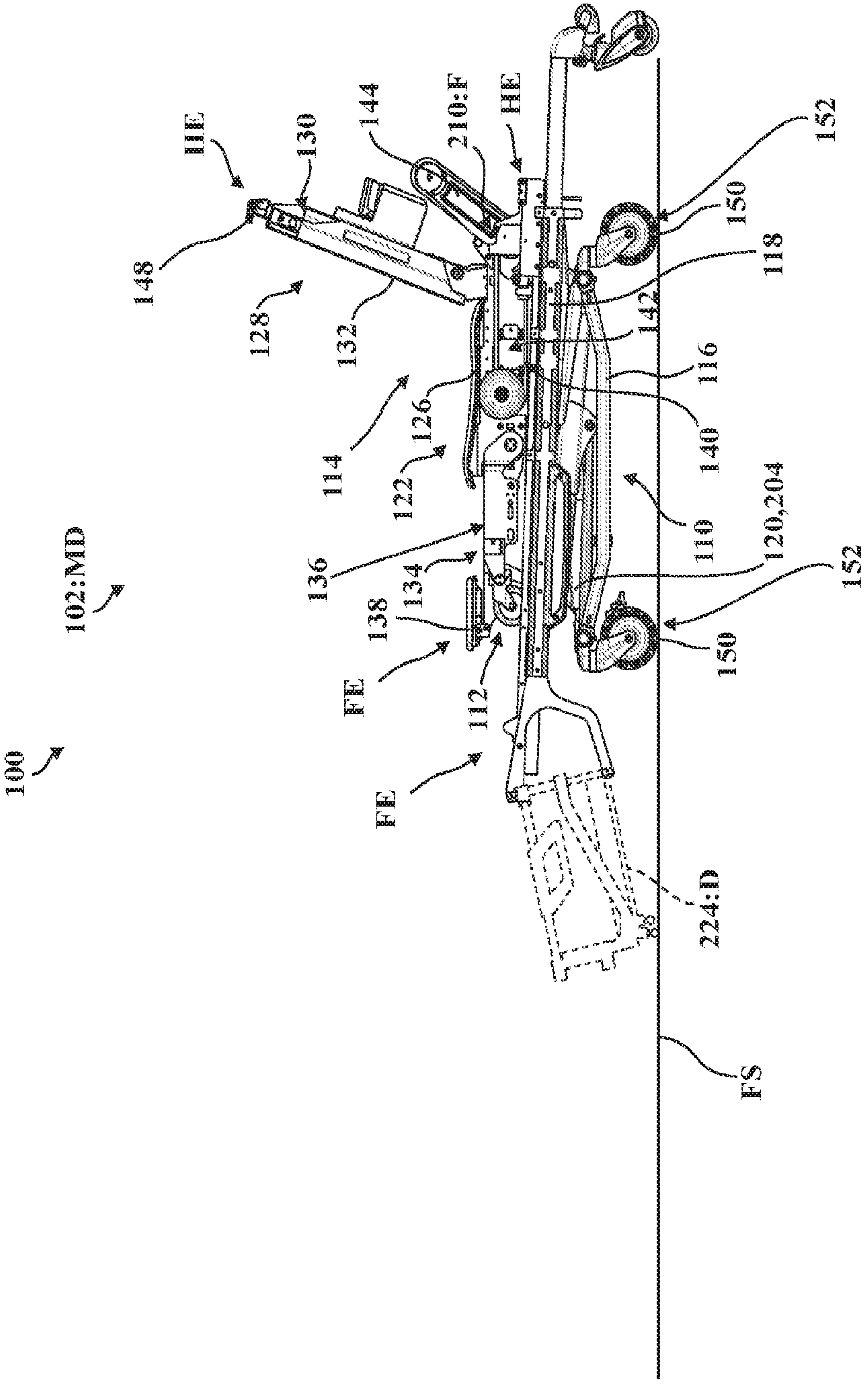
FIG. 3E is another side view of the patient transport apparatus of FIGS. 1A-3D, shown with the litter having moved with the trolley to a trolley forward position to place the patient transport apparatus in the docked mode MD.
Figure 3F:
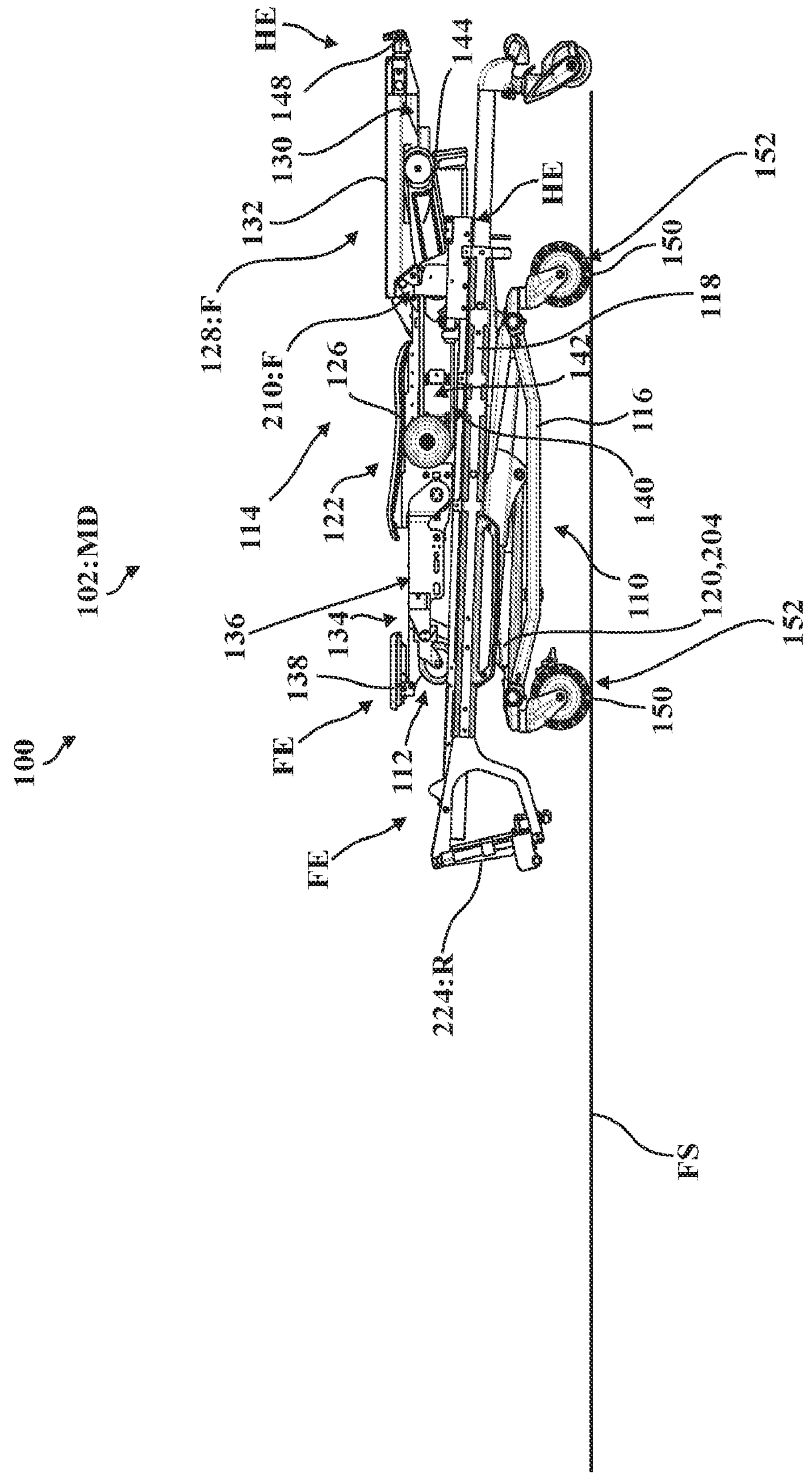
FIG. 3F is another side view of the patient transport apparatus of FIGS. 1A-3E, shown operating in the docked mode, with the stabilizers moved to the retracted configuration, and with a fowler assembly of the litter shown arranged in a fowler lowered position.
Figure 3G:
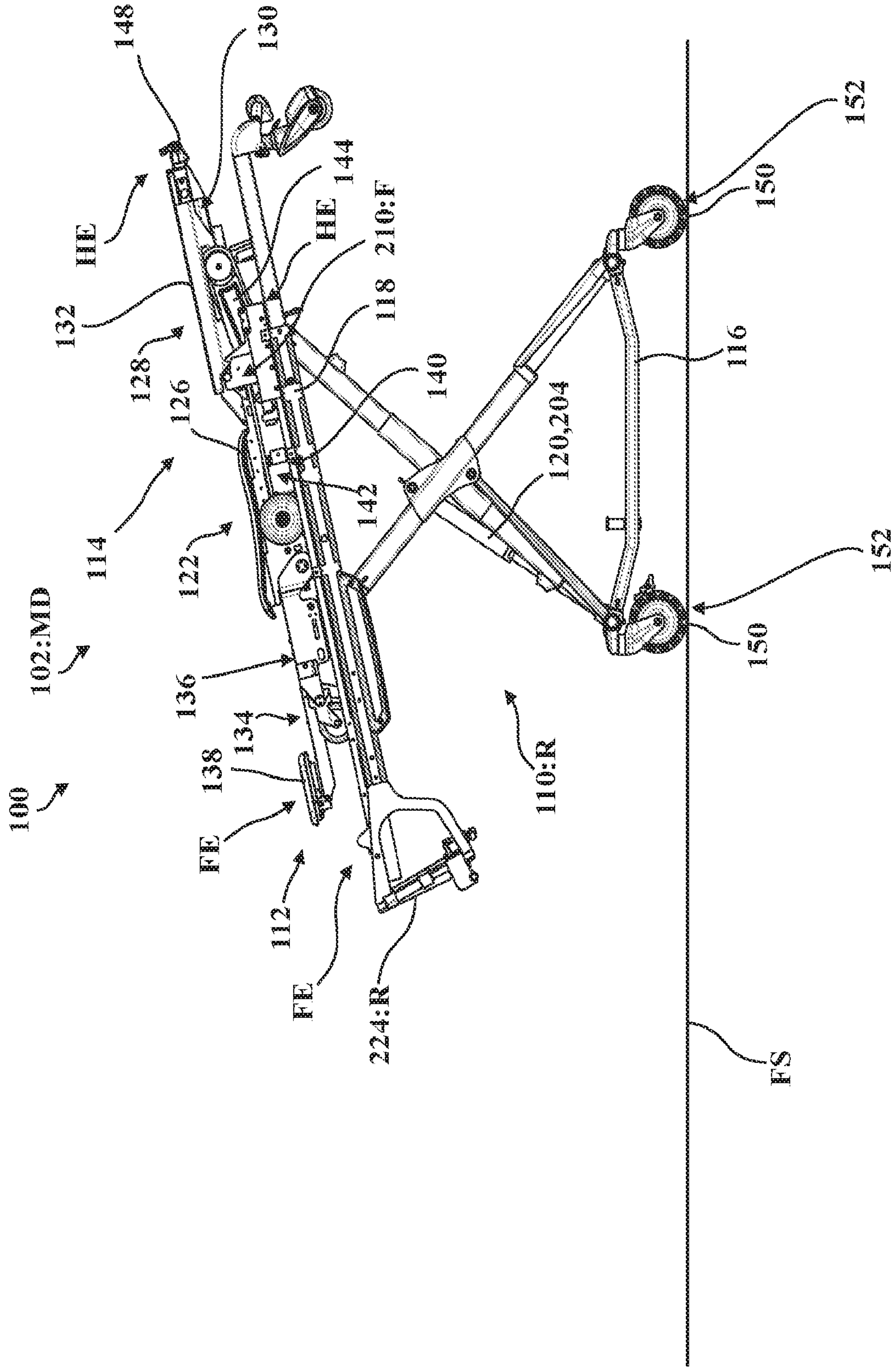
FIG. 3G is another side view of the patient transport apparatus of FIGS. 1A-3F, shown operating in the docked mode, with the base arranged in a raised configuration.

In FIG. 3D, the litter 112 is shown disposed in the cantilevered position CP with the trolley 210 disposed in the trolley docking position 210D arranged at the foot end FE of the base 110. Here, the front assembly 134 and the rear assembly 140 are arranged generally parallel to each other and to the seat assembly 122. From this cantilevered position CP depicted in FIG. 3D, the dock trolley lock mechanism 222 can be disengaged by the user, and the trolley 210 can be moved to the trolley forward position 210F arranged at the head end HE of the base 110, as shown in FIG. 3E. Here, in FIG. 3E, the dock trolley lock mechanism 222 retains the trolley 210 in the trolley forward position 210F which places the patient transport apparatus 102 in the docked mode MD. At this point, the stabilizer can be moved to the retracted position 224R out of contact with the floor surface FS, and other portions of the patient transport apparatus 102 may be moved if needed, such as to move the fowler assembly 128 to the fowler lowered position 128L as shown in FIG. 3F and/or to raise the intermediate frame 118 to position the base 110 in the maximum raised configuration 110R as shown in FIG. 3G.

FIG. 4A shows the patient transport apparatus 102 in the docked mode MD and positioned adjacent to the cargo area 104 of the ambulance 106 for loading via the power load device 108. Here, the base 110 is arranged with the intermediate frame 118 raised relative to the base frame 116 near or slightly below the maximum raised configuration 110R in order to facilitate loading the patient transport apparatus 102 into the ambulance 106. Continuing to FIG. 4B from FIG. 4A, the patient transport apparatus 102 has been loaded onto the power load device 108 at the first rail end 226A of the rail 226. Here too in FIG. 4B, the base lift device 120 of the base 110 has been utilized to position the base 110 in the maximum lowered configuration 110L, which results in the base wheels 150 coming out of contact with the floor surface FS after weight from the patient transport apparatus 102 has been transferred to the power load device 108 via the load arms 232. At this point, the rail trolley 228 may be moved towards the second rail end 226B of the rail 226 as shown in FIG. 4C in order to load the patient transport apparatus 102 fully into the cargo area 104 of the ambulance 106.

Referring now to FIGS. 5-8, when operating in the undocked mode MU, the litter 112 can be placed in a number of different configurations to support the patient for movement independent of the base 110. In FIG. 7A, for example, the litter 112 is arranged in the loft configuration CL with the rear assembly 140, the front assembly 134, and the fowler assembly 128 each arranged generally parallel to the seat assembly 122 to support the patient in a flat configuration (e.g., laying down). Here in the loft configuration CL, the rear assembly 140 is in the rear assembly loft position 140L, the front assembly 134 is in the front assembly loft position 134L, the fowler assembly 128 is in the fowler lowered position 128L, and the ski assembly is in the lowered ski position 144L. From this position, the litter 112 can be moved into the chair configuration CC depicted in FIG. 7C by moving the front assembly 134 to the front assembly chair position 134C while also moving the rear assembly 140 to the rear assembly chair position 140C and the fowler assembly 128 to the fowler raised position 128R. Here, it will be appreciated that FIG. 7B depicts intermediate positions of the front assembly 134, the rear assembly 140, and the fowler assembly.

Figure 5:
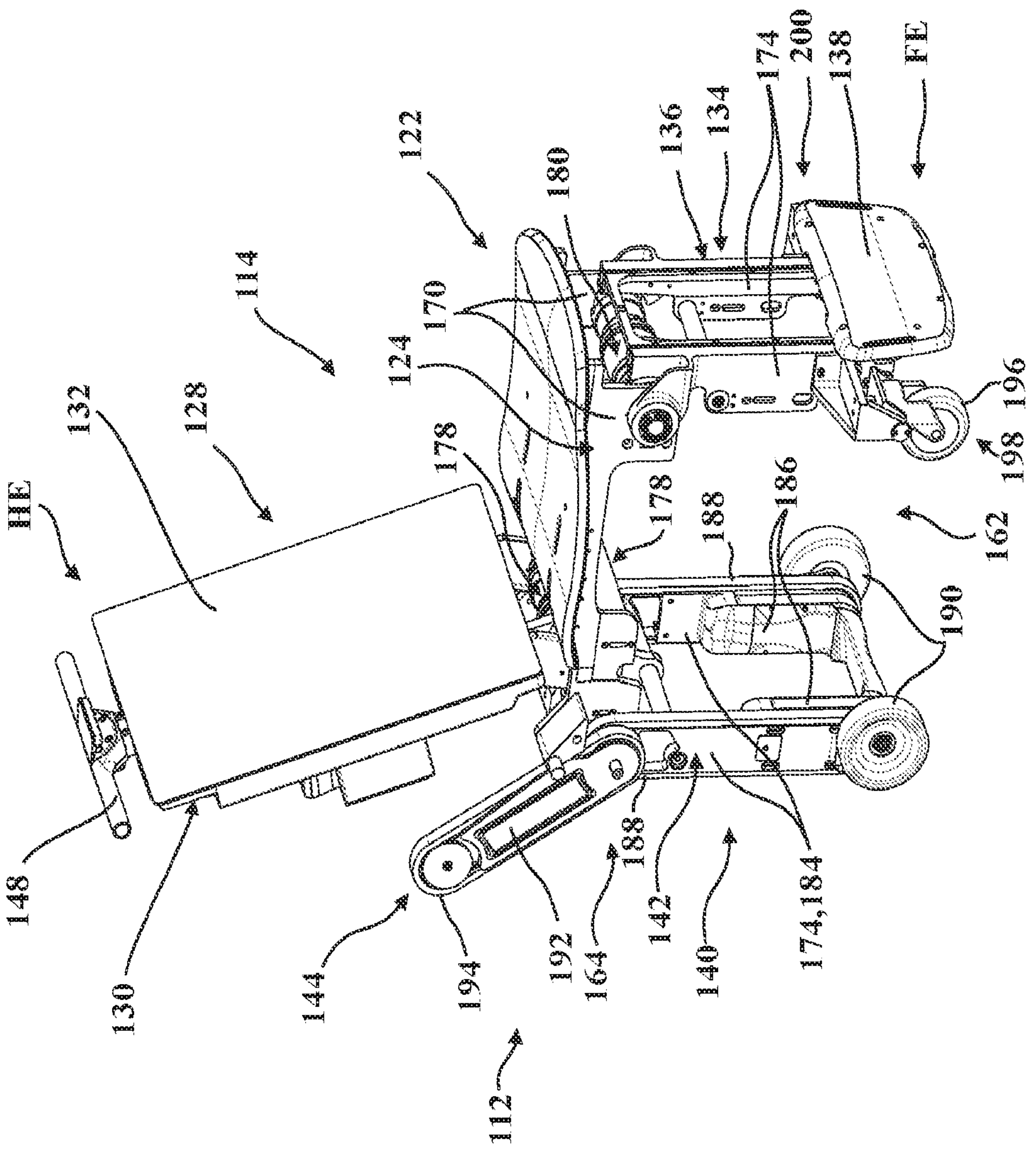
FIG. 5 is a front perspective view of the litter of the patient transport apparatus of FIGS. 1A-4C.
Figure 6:
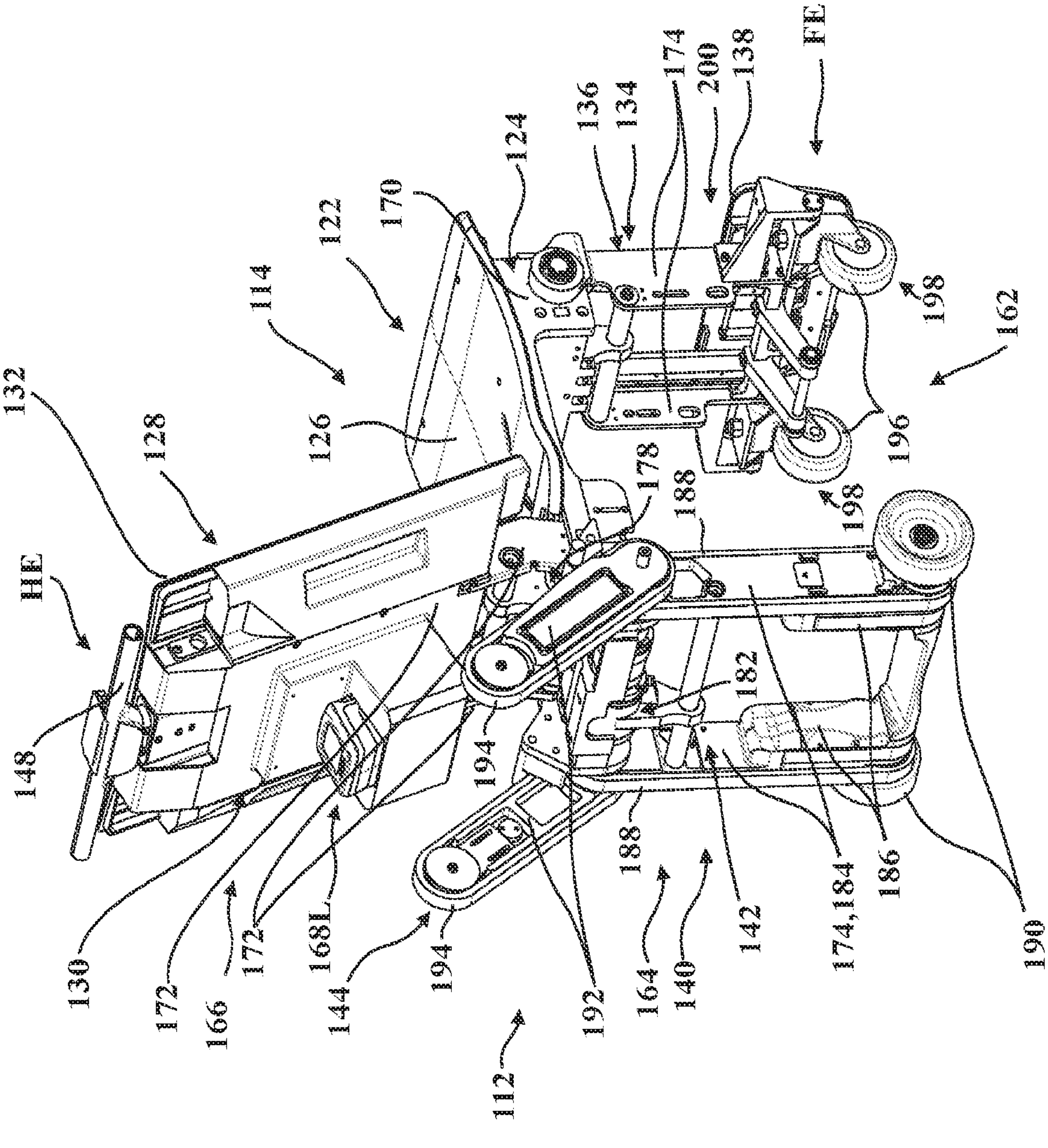
FIG. 6 is a rear perspective view of the litter of the patient transport apparatus of FIGS. 1A-5.

In the chair configuration CC depicted in FIGS. 5-6 and 7C, the rear assembly 140 and the front assembly 134 are each arranged parallel to each other and generally perpendicular to the seat assembly 122. From the chair configuration CC, the rear assembly 140 and the front assembly 134 can be moved simultaneously to bring the litter 112 into the stair configuration CS as depicted in FIG. 7D by placing the rear assembly 140 in the rear assembly stair position 140S and by placing the front assembly 134 in the front assembly stair position 134S. Here too in the stair configuration CS depicted in FIG. 7D, the front assembly 134 and the rear assembly 140 are arranged substantially parallel to each other, but are now arranged an oblique angle relative to the seat assembly 122 in order to, among other things, position the leg tracks 188 for engagement with stairs ST as shown in FIG. 8. Here in the stair configuration CS, the track driving device 164 can be used to move the litter 112 along stairs ST via engagement with the leg tracks 188 (as well as the ski tracks 194). It will be appreciated that the litter 112 can be moved between the configurations CL, CC, CS in various ways to facilitate patient care, and can be docked to and/or undocked from the base 110 as noted above.

Figure 9:
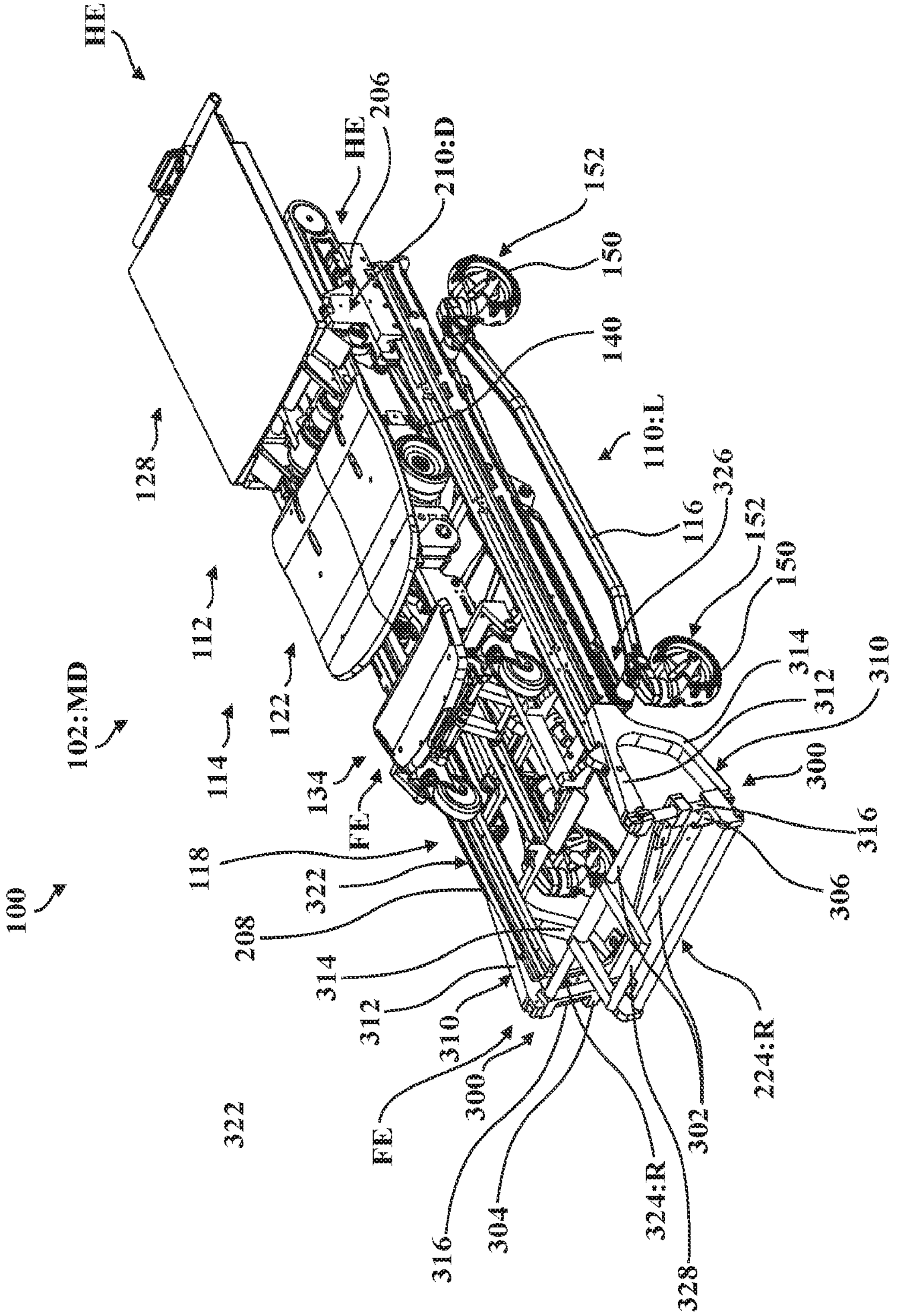
FIG. 9 is a front perspective view of portions of patient transport apparatus of FIGS. 1A-4C shown operating in the docked configuration and with a first stabilizer in a retracted configuration and a second stabilizer in a retracted configuration.
Figure 10A:
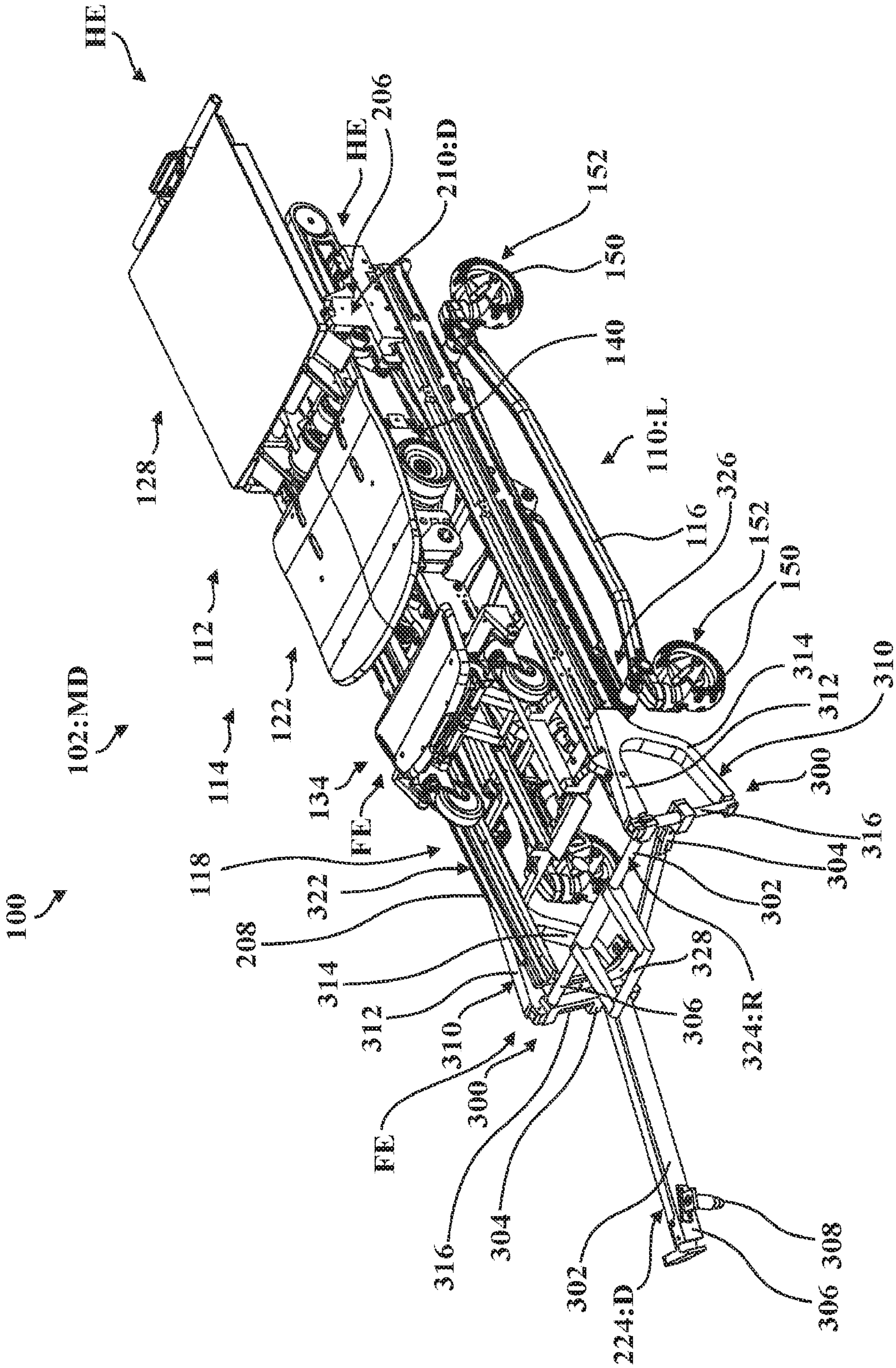
FIG. 10A is another front perspective view of the portions of the patient transport apparatus of FIG. 9 shown with the first stabilizer in the deployed configuration and with the second stabilizer in the retracted configuration.
Figure 10B:
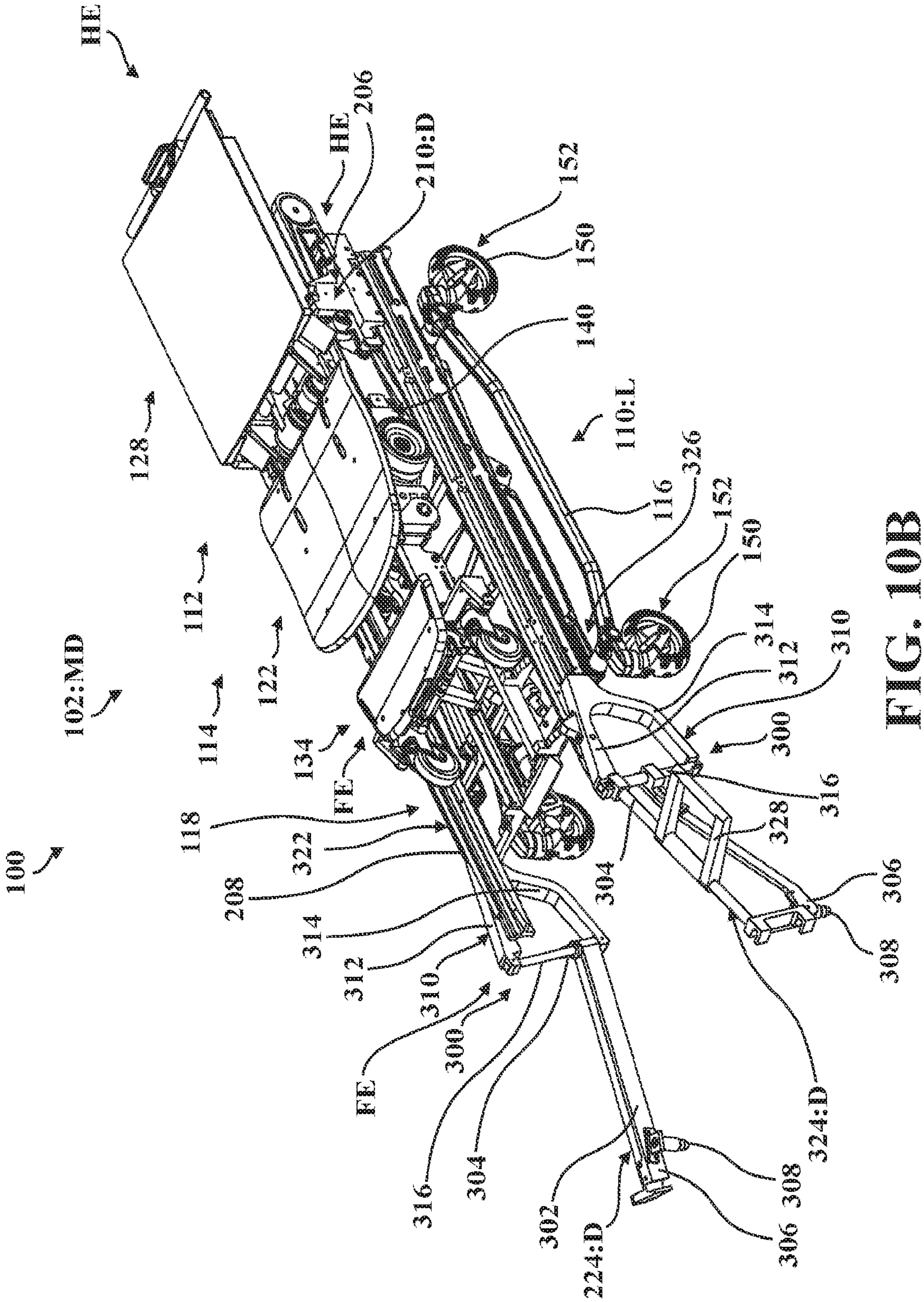
FIG. 10B is another front perspective view of the portions of the patient transport apparatus of FIGS. 9-10A shown with the first stabilizer in the deployed configuration and with the second stabilizer in the deployed configuration.
Figure 11:
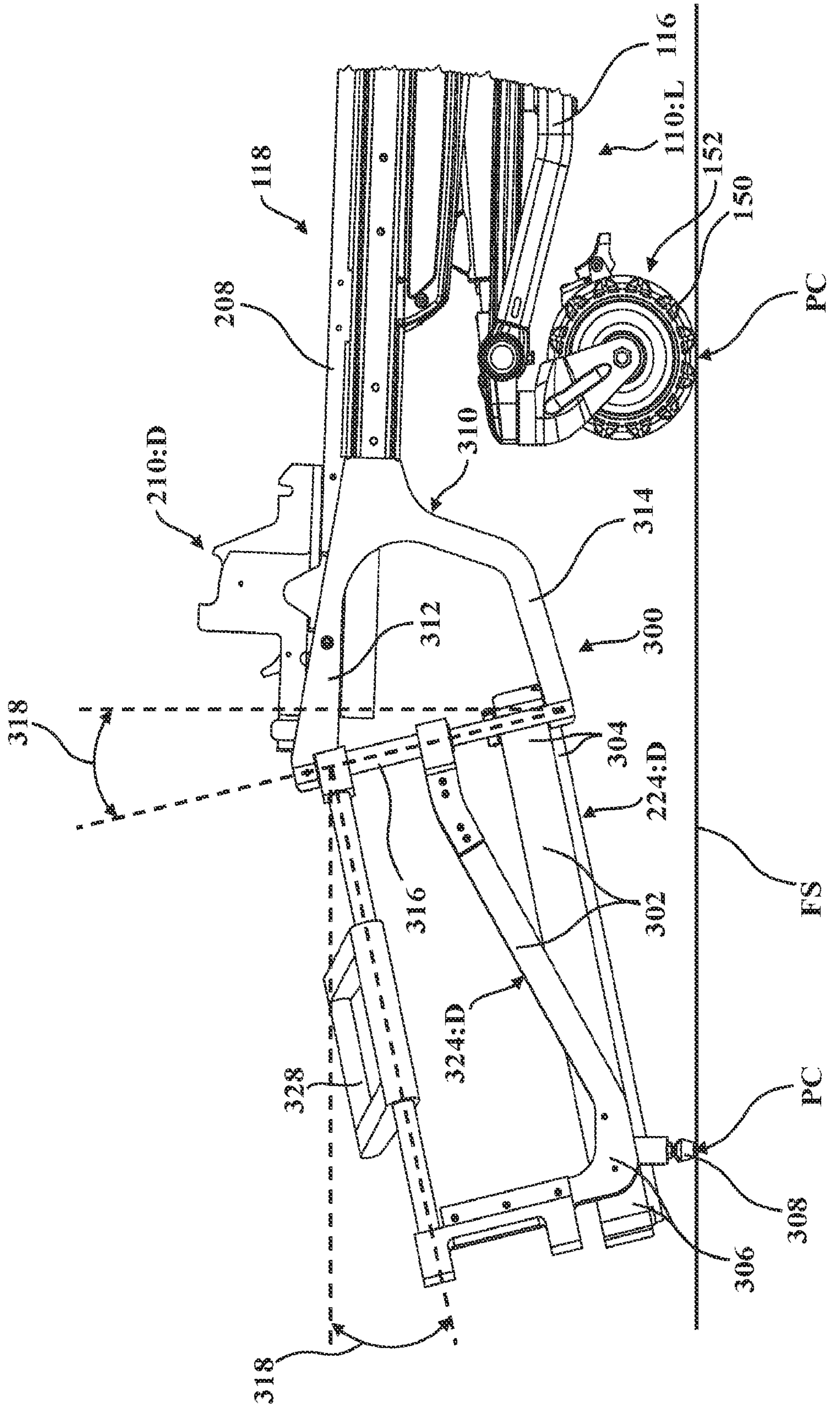
FIG. 11 is a partial side view of the patient transport apparatus of FIG. 10B.

Referring to FIGS. 9-11, in some versions, the stabilizer 224 may include a stabilizer mount 300 coupled to the foot end FE of the intermediate frame 118. The stabilizer mount 300 extends off the foot end FE of the intermediate frame such that the stabilizer mount 300 is disposed in spaced relation with the wheels 150 and does not collide with any of the wheels 150. In the illustrated versions, the stabilizer 224 includes stabilizer body 302 with a first end 304 and a second end 306 opposite the first end 304. The first end 304 is operatively attached to the stabilizer mount 300 such that the stabilizer mount 300 supports the stabilizer body 302 for movement between the retracted configuration 224R (shown in FIG. 9) and the deployed configuration 224D (shown in FIGS. 10A-11). In the illustrated versions, the stabilizer body 302 is pivotably coupled to the stabilizer mount 300 as described in greater detail below. It will be appreciated that the first end 304 of the stabilizer body 302 may be operatively attached to the stabilizer mount 300 in a number of different ways. For example, the stabilizer body 302 may be operatively attached to the stabilizer mount 300 via, hinges, pivoting linkages, and the like. In the retracted configuration 224R, the stabilizer body 302 may be arranged such that the stabilizer body 302 extends generally laterally across the intermediate frame 118 adjacent to the foot end FE. In the deployed configuration 224D, the stabilizer body 302 may be arranged such that the stabilizer body 302 extends away from the foot end FE of the intermediate frame 118, as described in greater detail below.

With continued reference to FIGS. 9-11, in some versions, the stabilizer 224 may further include a stabilizer foot 308 operatively attached to the second end 306 of the stabilizer body 302. The stabilizer foot 308 may be configured to engage the floor surface FS to brace the base 110 at an additional point of contact PC with the floor surface FS (see FIG. 11) to stabilize the base 110 when the litter 112 is in the cantilevered position CP. The stabilizer foot 308 may be operatively attached to the stabilizer body 302 in a number of different ways. For example, the stabilizer foot 308 may be operatively attached to the stabilizer body 302 via threaded connectors, ratcheting connectors, spring biased connectors, and the like. The stabilizer foot 308 may be vertically adjustable relative to the stabilizer body 302 such that the stabilizer foot 308 is capable of engaging an uneven floor surface FS. For example, if the floor surface FS includes a divot near the second end 306 of the stabilizer body 302, the stabilizer foot 308 may have an adjustable height such that the distance that the stabilizer foot 308 extends downward from the second end 306 may be increased such that the stabilizer foot 308 may reach the uneven floor surface FS surface to brace the base 110 at an additional point of contact PC.

With continued reference to FIGS. 9-11, the illustrated stabilizer mount 300 includes a yoke 310 coupled to and extending from the foot end FE of the intermediate frame 118. The yoke 310 facilitates operatively attaching the first end 304 of the stabilizer body to the intermediate frame 118, and may be of a number of different shapes, configurations, arrangements, and the like. For example, the yoke 310 may define a first prong 312 and a second prong 314, and the stabilizer mount 300 may also include a post 316 extending between the first prong 312 and the second prong 314. In the illustrated versions, the first end 304 of the stabilizer body 302 is pivotably coupled to the post such that the stabilizer body 302 is configured for pivotal movement to move the stabilizer 224 between the retracted configuration 224R and the deployed configuration 224D.

Referring to FIG. 11, in the illustrated version, the post 316 is arranged at a tilt angle 318 relative to the intermediate frame 118 such that the stabilizer body 302 extends away from the foot end FE of the intermediate frame 118 at the tilt angle 318 towards the floor surface in the deployed configuration 224D. To this end, the tilt angle 318 is arranged transverse to a vertical reference of the patient transport apparatus 102, defined such as by a portion of the intermediate frame 118 (not shown in detail). In some versions, the first prong 312 of the yoke 310 may extend longitudinally further away from the head end HE than the second prong 314 such that the post 316 supported between the first prong 312 and the second prong 314 is arranged at the tilt angle 318. The tilt angle 318 may be any suitable angle such that the stabilizer body 302 can extend downward toward the floor surface FS in the deployed configuration 224D. For example, the tilt angle 318 may be, but is not limited to, 5 degrees, 15 degrees, 25 degrees, and the like.

Figure 12:
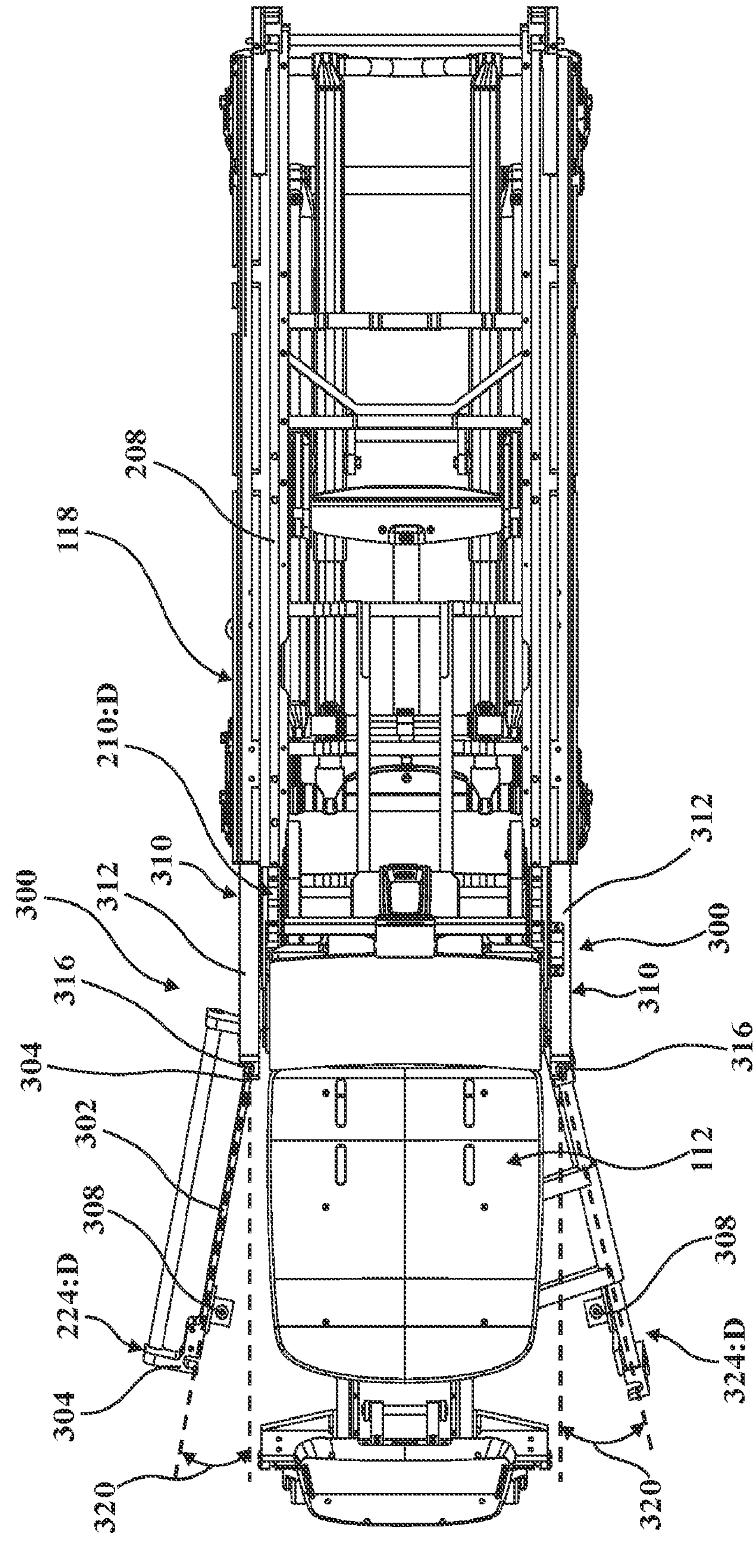
FIG. 12 is a top view of portions the patient transport apparatus of FIGS. 1-4C shown with the base and the litter arranged in the cantilevered position.

The stabilizer body 302 may be configured to pivot at least 90 degrees about the post 316 between the retracted configuration 224R and the deployed configuration 224D to promote access to the foot end FE of the base 110 in the deployed configuration 224D. As shown in FIG. 12, the stabilizer body 302 may be movable to a pivot angle 320 relative to the lateral side of the intermediate frame 118. The pivot angle 320 may be any suitable angle to promote access to the foot end FE of the base 110. For example, the pivot angle 320 of the stabilizer body 302 may include, but is not limited to, 95 degrees, 105 degrees, 115 degrees, 125 degrees, and the like. Here, it will be appreciated that promoting access to the foot end FE of the base 110 helps to facilitate the process of docking and undocking the litter 112 with the base 110, such as to provide room for the rear legs 176 near the foot end FE of the base 110 in order to pivot from the loft configuration 140L to the rear assembly dock position 140D.

Referring again to FIGS. 9-11, in the illustrated version, the stabilizer 224 may be further defined as a first stabilizer 224 configured for movement between a first retracted configuration 224R and a first deployed configuration 224D. The first stabilizer 224 may operatively attached to a first lateral side 322 of the foot end FE of the intermediate frame 118. Here, the base 110 also includes a second stabilizer 324 operatively attached to the foot end FE of the intermediate frame 118 and configured for movement between a second retracted configuration 324R where the second stabilizer 324 is disposed in spaced relation from the floor surface FS, and a deployed configuration 324D where the stabilizer 324 engages the floor surface FS to brace the base 110 at an additional point of contact PC with the floor surface FS to stabilize the base 110 when the litter 112 is in the cantilevered position CP during the process of docking the litter 112 to the base 110. Here too, the second stabilizer 324 has a stabilizer body 302 with a first end 304 and a second end 306 opposite the first end 304, and also includes a stabilizer foot 308. The first end 304 of the second stabilizer 324 may operatively attached to a second lateral side 326 of the foot end FE of the intermediate frame 118. The second lateral side 326 may be opposite the first lateral side 322 of the intermediate frame. In some versions, the first stabilizer 224 and the second stabilizer 324 may be configured to be deployed sequentially. For example, it may be necessary for the first stabilizer 224 to be moved from the first retracted position 224R to the first deployed configuration 224D before the second stabilizer 324 is moved from the second retracted position 324R to the second deployed configuration 324D. However, it is contemplated that in other configurations, the first stabilizer 224 and the second stabilizer 324 may be deployed simultaneously, or the second stabilizer 324 may be deployed before the first stabilizer 224.

Figure 13:
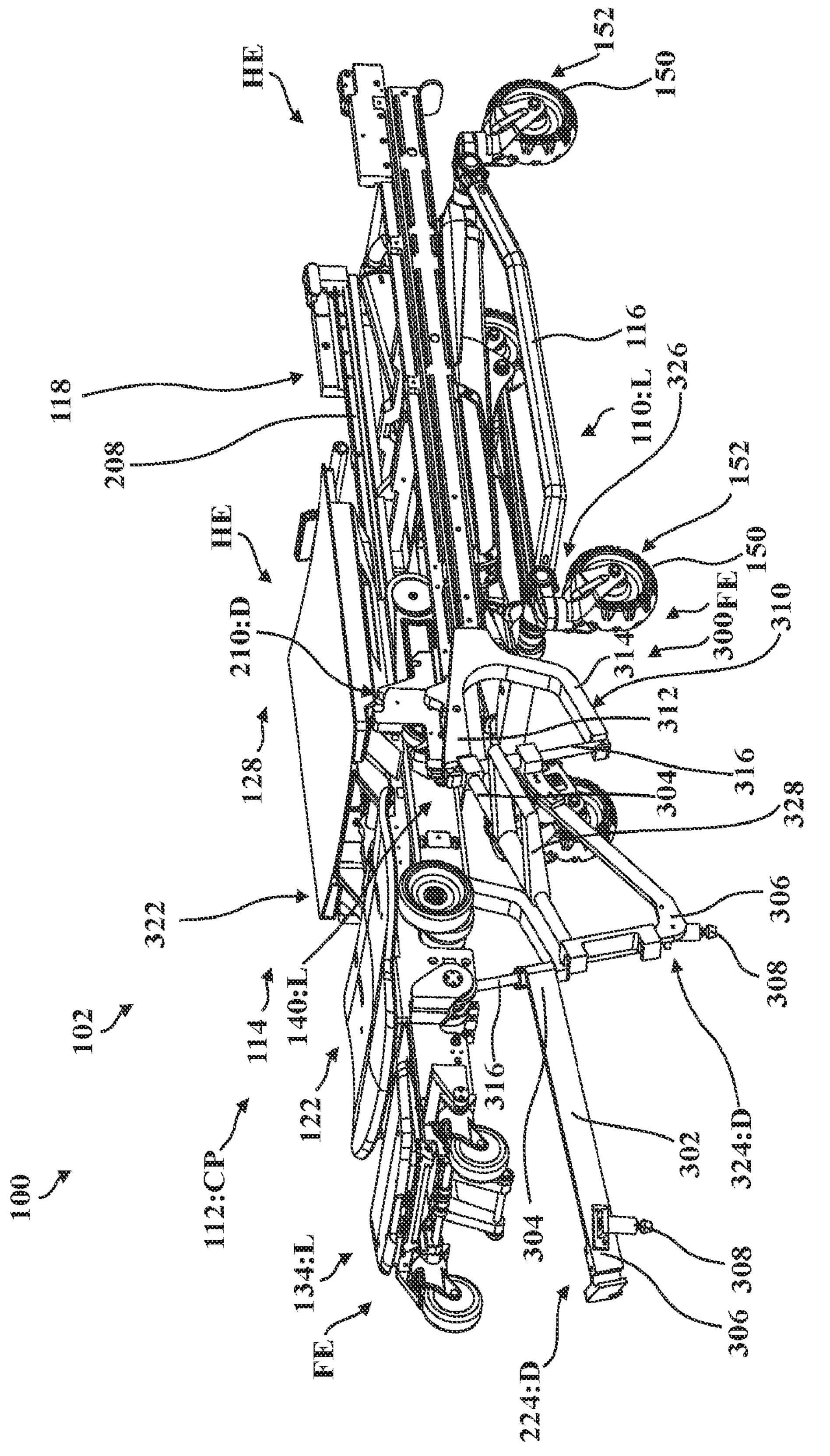
FIG. 13 is a front perspective view of portions the patient transport apparatus of FIGS. 1-4C shown with the base and the litter arranged in the cantilevered position.
Figure 14:
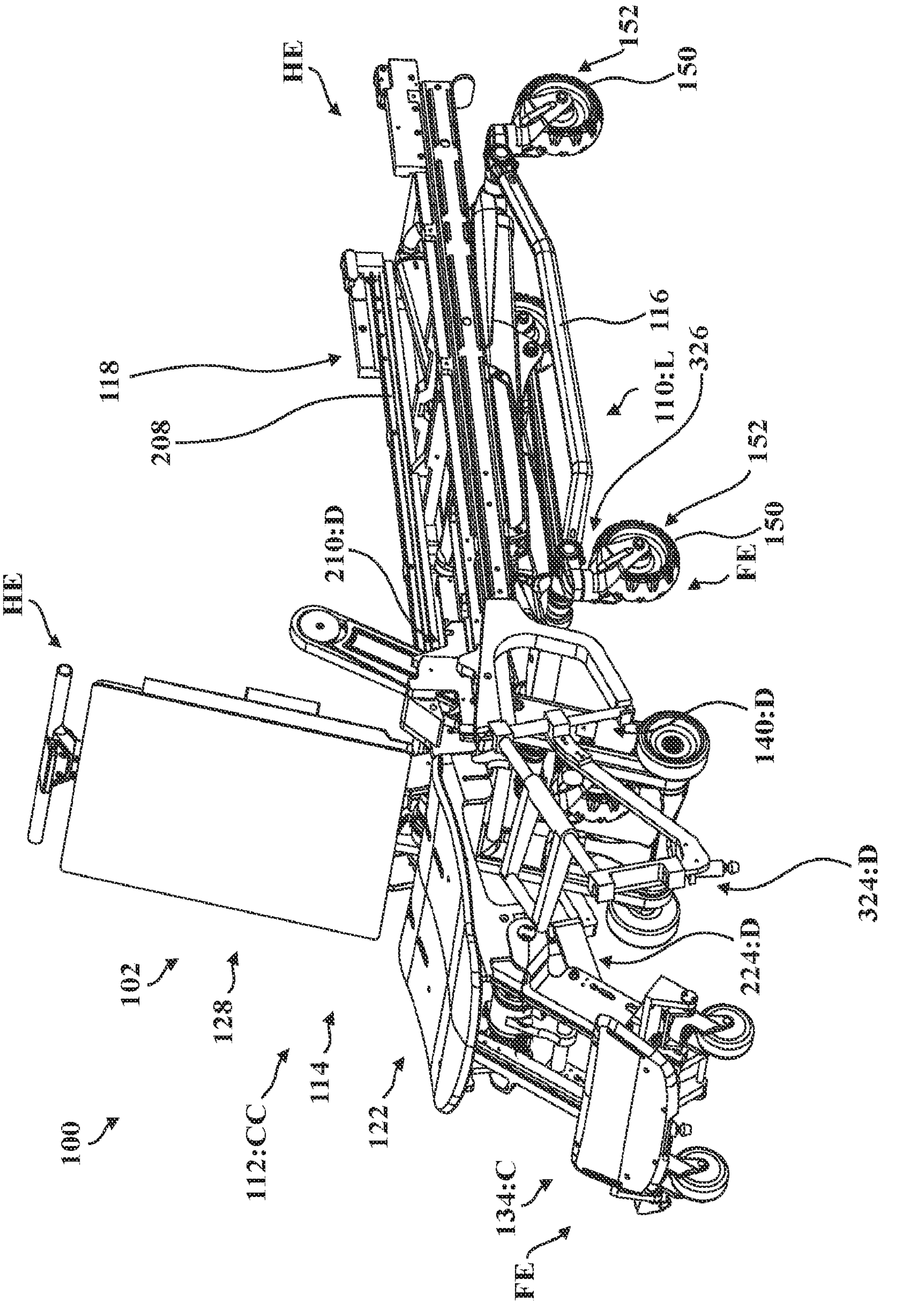
FIG. 14 is another front perspective view of the portions of the patient transport apparatus of FIG. 13 shown transitioning between the undocked mode and the docked mode.

Referring to FIGS. 13-14, in some configurations, when the litter 112 is docked to the trolley 210 and the stabilizer 224, 324 are in the deployed configurations 224D, 324D, the front actuator 180 of the litter 112 may be configured to actuate the front assembly 134 from the front assembly chair position 134C the front assembly loft position 134L (shown in FIGS. 3C-3D). Similarly, the rear actuator 182 may be configured to actuate the rear assembly 140 from the rear assembly dock position 140D to the rear assembly loft position 140L. With both the front assembly 134 and the rear assembly 140 in their respective loft positions 134L, 140L, the litter 112 is thus arranged in the cantilevered position CP. Here, it will be appreciated that the stabilizer 224, 324 being in their deployed configurations 224D, 324D facilitates operation in the cantilevered position CP by providing additional points of contact PC with the floor surface FS to brace the base 110. This allows the litter 112 to be disposed in the cantilevered position CP without causing the base 110 to tip or otherwise become unstable on the floor surface FS as weight is transferred. In some versions, the stabilizer 224, 324 may be arranged at the foot end FE of the intermediate frame 118 such that, when in the deployed configurations, 224D, 324D, the foot end FE of the base 110 is unobstructed to allow the rear assembly 140 of the litter 112 to move between the rear assembly chair position 140C and the rear assembly loft position 140L.

Figure 15:
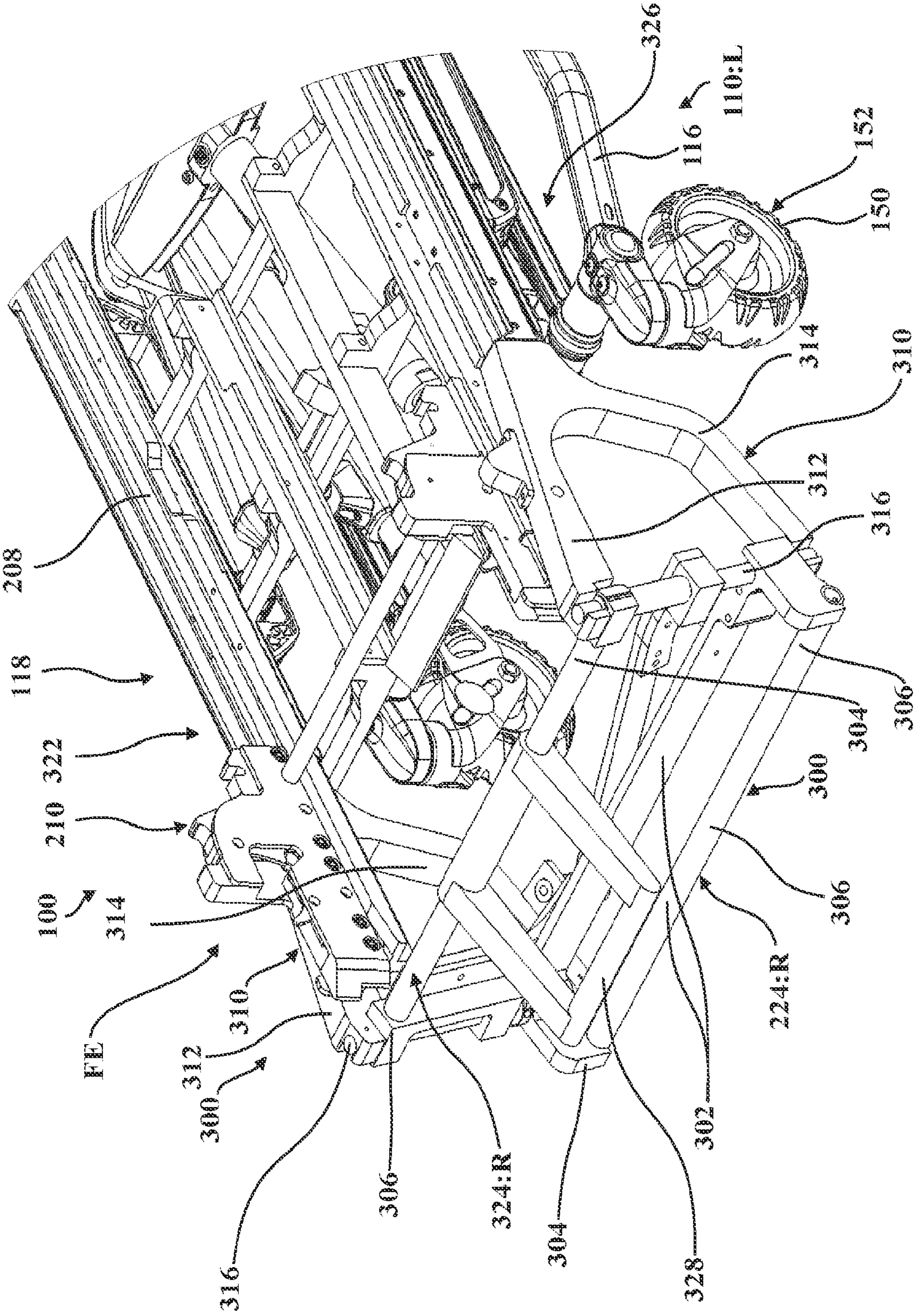
FIG. 15 is a partial front perspective view of the patient transport apparatus of FIGS. 1-4C, shown with a handle coupled to the base.

Referring to FIG. 15, the first stabilizer 224 and/or the second stabilizer 324 may include a handle 328 configured to be grasped by a user when the first stabilizer 224 and/or the second stabilizer 324 is in the retracted position 224R, 324R to facilitate moving the patient transport apparatus 102 about the floor surface FS. The handle 328 serves as a caregiver interface 148, may be any suitable shape to be grasped by the user, and may be mounted to the first stabilizer 224 and/or the second stabilizer 324 in a number of different ways. For example, the handle 328 may pivot about the stabilizer body 302.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient transport apparatus for supporting a patient, the patient transport apparatus comprising:
- a base having a head end and a foot end, the base including:
  - a base frame supporting a plurality of wheels arranged for movement about a floor surface at respective contact points,
  - an intermediate frame having a trolley configured to translate between a plurality of trolley positions including a trolley forward position where the trolley is arranged at the head end of the base and a trolley docking position where the at trolley is arranged at the foot end of the base, and
  - a base lift device to move the intermediate frame relative to the base frame between a plurality of vertical configurations including a maximum raised configuration and a maximum lowered configuration;
- a litter configured to be docked to and undocked from the trolley of the intermediate frame such that, when docked to the trolley, the litter is configured to slidably translate relative to the intermediate frame between a plurality of litter positions including a litter forward position where the trolley is in the trolley forward position and a cantilevered position where the trolley is in the trolley docking position such that the litter is cantilevered off the foot end of the base to facilitate docking and undocking the litter from the trolley; and a stabilizer operatively attached to the foot end of the intermediate frame and configured for movement between:

a retracted configuration where the stabilizer is spaced from the floor surface, and a deployed configuration where the stabilizer engages the floor surface to brace the base at an additional point of contact with the floor surface to stabilize the base in the cantilevered position.

II. The patient transport apparatus of clause I, wherein the stabilizer includes a stabilizer mount coupled to the foot end of the intermediate frame, and a stabilizer body including a first end and a second end, with the first end of the stabilizer body operatively attached to the stabilizer mount such that the stabilizer mount supports the stabilizer body for movement between the retracted configuration and the deployed configuration.

III. The patient transport apparatus of clause II, wherein the stabilizer mount extends off the foot end of the base and is arranged in spaced relation with the plurality of wheels.

IV. The patient transport apparatus of any one of clauses II-III, wherein the stabilizer further includes a stabilizer foot operatively attached to a second end of the stabilizer body, with the stabilizer foot being configured to engage the floor surface to brace the base at the additional point of contact with the floor surface to stabilize the base when the litter is in the cantilevered position.

V. The patient transport apparatus of clause IV, wherein the stabilizer foot is vertically adjustable relative to the stabilizer body.

VI. The patient transport apparatus of any one of clauses II-V, wherein the stabilizer mount includes a yoke coupled adjacent to the foot end of the intermediate frame, the yoke supporting a post; and wherein the first end of the stabilizer body is pivotably coupled to the post such that the stabilizer body pivots relative to the yoke between the retracted configuration and the deployed configuration.

VII. The patient transport apparatus of clause VI, wherein the post is arranged at a tilt angle relative to the intermediate frame such that the stabilizer body extends away from the foot end of the intermediate frame at the tilt angle toward the floor surface in the deployed configuration.

VIII. The patient transport apparatus of any one of clauses VI-VII, wherein the stabilizer body is configured to pivot at least XC degrees about the post between the retracted configuration and the deployed configuration to promote access to the foot end of the base in the deployed configuration.

IX. The patient transport apparatus of any one of clauses I-VIII, wherein the stabilizer is further defined as a first stabilizer, the retracted configuration is further defined as a first retracted configuration, and the deployed configuration is further defined as a first deployed configuration, with the first stabilizer operatively attached to a first lateral side of the foot end of the intermediate frame; and wherein the patient transport apparatus further comprises a second stabilizer operatively attached to a second lateral side of the foot end of the base frame, the second stabilizer configured for movement between:

a second retracted configuration where the second stabilizer is disposed in spaced relation from the floor surface, and a second deployed configuration where the second stabilizer engages the floor surface to brace the base at a second additional point of contact with the floor surface.

X. The patient transport apparatus of clause IX, wherein the first stabilizer and the second stabilizer are configured to be deployed sequentially.

XI. The patient transport apparatus of any one of clauses I-X, wherein the litter further includes:

a seat assembly having a front end and a rear end and defining a seat frame and a patient support surface for supporting the patient;

a front assembly coupled to the front end of the seat frame and configured for movement between a plurality of front assembly positions including a front assembly chair position and a front assembly loft position; and a rear assembly coupled to the rear end of the seat frame and configured for movement between a plurality of rear assembly positions including a rear assembly chair position and a rear assembly loft position.

XII. The patient transport apparatus of clause XI, wherein the litter further includes:

a front actuator arranged to articulate the front assembly relative to the seat frame between the front assembly chair position and the front assembly loft position; and a rear actuator arranged to articulate the rear assembly relative to the seat frame between the rear assembly chair position and the rear assembly loft position.

XIII. The patient transport apparatus of clause XII, wherein, when the litter is docked to the trolley and the stabilizer is in the deployed configuration, the front actuator configured to actuate the front assembly to the front assembly loft position and the rear assembly to the rear assembly loft position such that the litter is in the cantilevered position.

XIV. The patient transport apparatus any one of clauses XI-XIII, wherein the stabilizer is arranged at the foot end of the intermediate frame such that, in the deployed configuration, the foot end of the base is unobstructed to allow the rear assembly of the litter to move between the rear assembly chair position and the rear assembly loft position.

XV. The patient transport apparatus of any one of clauses XI-XIV, wherein the stabilizer is further defined as a first stabilizer, the retracted configuration is further defined as a first retracted configuration, and the deployed configuration is further defined as a first deployed configuration, with the first stabilizer operatively attached to a first lateral side of the foot end of the intermediate frame; and wherein the patient transport apparatus further comprises a second stabilizer operatively attached to a second lateral side of the foot end of the intermediate frame, the second stabilizer configured for movement between:

a second retracted configuration where the second stabilizer is disposed in spaced relation from the floor surface, and a second deployed configuration where the second stabilizer engages the floor surface to brace the base at a second additional point of contact with the floor surface.

XVI. The patient transport apparatus of clause XV, wherein the first stabilizer and the second stabilizer are each arranged at the foot end of the intermediate frame such that, in the first and second deployed configurations, the foot end of the base in unobstructed to allow the rear assembly to move between the rear assembly chair position and the rear assembly loft position.

XVII. The patient transport apparatus of any one of clauses I-XVI, wherein the stabilizer includes a handle configured to be grasped by a user when the stabilizer is in the retracted configuration to facilitate movement of the patient transport apparatus about the floor surface.

What is claimed is:

1. A patient transport apparatus for supporting a patient, the patient transport apparatus comprising:

a base having a head end and a foot end, the base including:

a base frame supporting a plurality of wheels arranged for movement about a floor surface at respective contact points, an intermediate frame having a trolley configured to translate between a plurality of trolley positions including a trolley forward position where the trolley is arranged at the head end of the base and a trolley docking position where the at trolley is arranged at the foot end of the base, and a base lift device to move the intermediate frame relative to the base frame between a plurality of vertical configurations including a maximum raised configuration and a maximum lowered configuration;

a litter configured to be docked to and undocked from the trolley of the intermediate frame such that, when docked to the trolley, the litter is configured to slidably translate relative to the intermediate frame between a plurality of litter positions including a litter forward position where the trolley is in the trolley forward position and a cantilevered position where the trolley is in the trolley docking position such that the litter is cantilevered off the foot end of the base to facilitate docking and undocking the litter from the trolley; and a stabilizer operatively attached to the foot end of the intermediate frame and configured for movement between:

a retracted configuration where the stabilizer is spaced from the floor surface, and a deployed configuration where the stabilizer engages the floor surface to brace the base at an additional point of contact with the floor surface to stabilize the base in the cantilevered position.

2. The patient transport apparatus of claim 1, wherein the stabilizer includes a stabilizer mount coupled to the foot end of the intermediate frame, and a stabilizer body including a first end and a second end, with the first end of the stabilizer body operatively attached to the stabilizer mount such that the stabilizer mount supports the stabilizer body for movement between the retracted configuration and the deployed configuration.

3. The patient transport apparatus of claim 2, wherein the stabilizer mount extends off the foot end of the base and is arranged in spaced relation with the plurality of wheels.

4. The patient transport apparatus of claim 2, wherein the stabilizer further includes a stabilizer foot operatively attached to a second end of the stabilizer body, with the stabilizer foot being configured to engage the floor surface to brace the base at the additional point of contact with the floor surface to stabilize the base when the litter is in the cantilevered position.

5. The patient transport apparatus of claim 4, wherein the stabilizer foot is vertically adjustable relative to the stabilizer body.

6. The patient transport apparatus of claim 2, wherein the stabilizer mount includes a yoke coupled adjacent to the foot end of the intermediate frame, the yoke supporting a post; and wherein the first end of the stabilizer body is pivotably coupled to the post such that the stabilizer body pivots relative to the yoke between the retracted configuration and the deployed configuration.

7. The patient transport apparatus of claim 6, wherein the post is arranged at a tilt angle relative to the intermediate frame such that the stabilizer body extends away from the foot end of the intermediate frame at the tilt angle toward the floor surface in the deployed configuration.

8. The patient transport apparatus of claim 6, wherein the stabilizer body is configured to pivot at least 90 degrees about the post between the retracted configuration and the deployed configuration to promote access to the foot end of the base in the deployed configuration.

9. The patient transport apparatus of claim 1, wherein the stabilizer is further defined as a first stabilizer, the retracted configuration is further defined as a first retracted configuration, and the deployed configuration is further defined as a first deployed configuration, with the first stabilizer operatively attached to a first lateral side of the foot end of the intermediate frame; and wherein the patient transport apparatus further comprises a second stabilizer operatively attached to a second lateral side of the foot end of the base frame, the second stabilizer configured for movement between:

a second retracted configuration where the second stabilizer is disposed in spaced relation from the floor surface, and a second deployed configuration where the second stabilizer engages the floor surface to brace the base at a second additional point of contact with the floor surface.

10. The patient transport apparatus of claim 9, wherein the first stabilizer and the second stabilizer are configured to be deployed sequentially.

11. The patient transport apparatus of claim 1, wherein the litter further includes:

a seat assembly having a front end and a rear end and defining a seat frame and a patient support surface for supporting the patient;

a front assembly coupled to the front end of the seat frame and configured for movement between a plurality of front assembly positions including a front assembly chair position and a front assembly loft position; and a rear assembly coupled to the rear end of the seat frame and configured for movement between a plurality of rear assembly positions including a rear assembly chair position and a rear assembly loft position.

12. The patient transport apparatus of claim 11, wherein the litter further includes:

a front actuator arranged to articulate the front assembly relative to the seat frame between the front assembly chair position and the front assembly loft position; and a rear actuator arranged to articulate the rear assembly relative to the seat frame between the rear assembly chair position and the rear assembly loft position.

13. The patient transport apparatus of claim 12, wherein, when the litter is docked to the trolley and the stabilizer is in the deployed configuration, the front actuator configured to actuate the front assembly to the front assembly loft position and the rear assembly to the rear assembly loft position such that the litter is in the cantilevered position.

14. The patient transport apparatus of claim 11, wherein the stabilizer is arranged at the foot end of the intermediate frame such that, in the deployed configuration, the foot end of the base is unobstructed to allow the rear assembly of the litter to move between the rear assembly chair position and the rear assembly loft position.

15. The patient transport apparatus of claim 11, wherein the stabilizer is further defined as a first stabilizer, the retracted configuration is further defined as a first retracted configuration, and the deployed configuration is further defined as a first deployed configuration, with the first stabilizer operatively attached to a first lateral side of the foot end of the intermediate frame; and wherein the patient transport apparatus further comprises a second stabilizer operatively attached to a second lateral side of the foot end of the intermediate frame, the second stabilizer configured for movement between:

a second retracted configuration where the second stabilizer is disposed in spaced relation from the floor surface, and a second deployed configuration where the second stabilizer engages the floor surface to brace the base at a second additional point of contact with the floor surface.

16. The patient transport apparatus of claim 15, wherein the first stabilizer and the second stabilizer are each arranged at the foot end of the intermediate frame such that, in the first and second deployed configurations, the foot end of the base in unobstructed to allow the rear assembly to move between the rear assembly chair position and the rear assembly loft position.

17. The patient transport apparatus of claim 1, wherein the stabilizer includes a handle configured to be grasped by a user when the stabilizer is in the retracted configuration to facilitate movement of the patient transport apparatus about the floor surface.

* * * * *